United States Patent
Kaneko et al.

(10) Patent No.: US 9,587,597 B2
(45) Date of Patent: Mar. 7, 2017

(54) INTERNAL COMBUSTION ENGINE

(71) Applicant: TOYOTA JIDOSHA KABUSHIKI KAISHA, Toyota-shi, Aichi (JP)

(72) Inventors: Naoya Kaneko, Susono (JP); Shinichi Mitani, Susono (JP); Daisuke Uchida, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/895,765

(22) PCT Filed: Apr. 9, 2014

(86) PCT No.: PCT/JP2014/060303
§ 371 (c)(1),
(2) Date: Dec. 3, 2015

(87) PCT Pub. No.: WO2014/196267
PCT Pub. Date: Dec. 11, 2014

(65) Prior Publication Data
US 2016/0131091 A1    May 12, 2016

(30) Foreign Application Priority Data
Jun. 5, 2013 (JP) .................... 2013-118848

(51) Int. Cl.
*F01N 3/00* (2006.01)
*F02M 27/02* (2006.01)
(Continued)

(52) U.S. Cl.
CPC ........... *F02M 27/02* (2013.01); *F01N 3/2033* (2013.01); *F01N 3/22* (2013.01); *F02B 17/005* (2013.01);
(Continued)

(58) Field of Classification Search
USPC .................................. 60/284, 285, 289, 299
See application file for complete search history.

(56) References Cited

U.S. PATENT DOCUMENTS

| 5,655,365 A | 8/1997 | Worth et al. |
| 6,041,593 A * | 3/2000 | Karlsson ............... F01N 3/0835 60/274 |

(Continued)

FOREIGN PATENT DOCUMENTS

| DE | 19615830 A1 | 10/1997 |
| JP | H11-324765 A | 11/1999 |

(Continued)

*Primary Examiner* — Thomas Denion
*Assistant Examiner* — Diem Tran
(74) *Attorney, Agent, or Firm* — Andrews Kurth Kenyon LLP

(57) ABSTRACT

In the present invention, an internal combustion engine is provided with an in-cylinder fuel injection valve and a secondary air supply device and is formed so as to make possible first catalyst warming control and second catalyst warming control that promote the raising of the temperature of an exhaust gas purification catalyst. The first catalyst warming control comprises control to inject fuel from the in-cylinder fuel injection valve during the compression stroke to form a stratified state, and control to greatly delay ignition timing. The second catalyst warming control comprises control to supply secondary air to an engine exhaust gas passage. The internal combustion engine executes the first catalyst warming control after startup and, after the first catalyst warming control is executed, carries out control (third catalyst warming control) to execute the first catalyst warming control and the second catalyst warming control simultaneously.

6 Claims, 11 Drawing Sheets

(51) Int. Cl.
*F01N 3/22* (2006.01)
*F02D 41/02* (2006.01)
*F02D 41/30* (2006.01)
*F02D 37/02* (2006.01)
*F02B 17/00* (2006.01)
*F02B 23/10* (2006.01)
*F02D 13/02* (2006.01)
*F01N 3/20* (2006.01)
*F02D 35/00* (2006.01)
*F02F 1/24* (2006.01)
*F02M 23/04* (2006.01)
*F01L 13/00* (2006.01)

(52) U.S. Cl.
CPC ........ *F02B 23/104* (2013.01); *F02D 13/0226* (2013.01); *F02D 35/0092* (2013.01); *F02D 37/02* (2013.01); *F02D 41/024* (2013.01); *F02D 41/3023* (2013.01); *F02F 1/242* (2013.01); *F02M 23/04* (2013.01); *F01L 13/0063* (2013.01); *F02B 2023/106* (2013.01); *F02D 41/0255* (2013.01); *Y02T 10/125* (2013.01); *Y02T 10/18* (2013.01); *Y02T 10/26* (2013.01)

(56) References Cited

U.S. PATENT DOCUMENTS

| | | | |
|---|---|---|---|
| 6,340,014 | B1 | 1/2002 | Tomita et al. |
| 6,354,078 | B1 * | 3/2002 | Karlsson ............... F01N 3/0835 123/559.2 |
| 8,806,868 | B2 * | 8/2014 | Wu ........................... F01N 3/30 60/280 |
| 2006/0130463 | A1 | 6/2006 | Miura |
| 2009/0025682 | A1 | 1/2009 | Okamoto |
| 2010/0050965 | A1 | 3/2010 | Nakamura |

FOREIGN PATENT DOCUMENTS

| | | |
|---|---|---|
| JP | 2000-120471 A | 4/2000 |
| JP | 2001-182586 A | 7/2001 |
| JP | 2004-052602 A | 2/2004 |
| JP | 2004-124824 A | 4/2004 |
| JP | 2004-332558 A | 11/2004 |
| JP | 2008-088875 A | 4/2008 |
| JP | 2009-024682 A | 2/2009 |
| JP | 2010-059791 A | 3/2010 |
| JP | 2011-099381 A | 5/2011 |

* cited by examiner

INTERNAL COMBUSTION ENGINE

CROSS-REFERENCE TO RELATED APPLICATIONS

This is a national phase application based on the PCT International Patent Application No. PCT/JP2014/060303 filed Apr. 9, 2014, claiming priority to Japanese Patent Application No. 2013-118848 filed Jun. 5, 2013, the entire contents of both of which are incorporated herein by reference.

TECHNICAL FIELD

The present invention relates to an internal combustion engine.

BACKGROUND ART

It is known to arrange an exhaust purification catalyst in an engine exhaust passage of an internal combustion engine to remove the carbon monoxide (CO), hydrocarbons (HC), and further nitrogen oxides ($NO_X$) and other components which are contained in the exhaust gas. The exhaust purification catalyst has an activation temperature which enables components of the exhaust gas to be removed at a high efficiency. Right after starting up an internal combustion engine after stopping it for a long time period etc., the exhaust purification catalyst is less than the activation temperature. It is desirable to quickly raise the exhaust purification catalyst to the activation temperature or more.

Japanese Patent Publication No. 11-324765A discloses a direct injection spark ignition type of internal combustion engine which warms up an exhaust purification catalyst in the time period from the time of start-up to when the exhaust purification catalyst is activated. In this internal combustion engine, when controlling the air-fuel ratio of the air-fuel mixture to the stoichoimetric one for combustion, fuel is injected in the intake stroke so as to form a homogeneous air-fuel mixture which is leaner than the stoichiometric one in the combustion chamber as a whole. Further, fuel is injected in the compression stroke so as to form and burn an air-fuel mixture which is relatively richer than the stoichiometric one in a stratified state around the spark plug. This discloses that this internal combustion engine can increase the ratio of CO which is contained in the burned gas and can easily react by an oxidation reaction and can lower the HC ratio. Further, this discloses to set the ignition timing to the retarded side.

Japanese Patent Publication No. 2001-182586A discloses an exhaust temperature raising device which injects an amount of fuel for locally generating a rich air-fuel mixture around a spark plug in a compression stroke when a rise in temperature of the exhaust gas is demanded. The exhaust temperature raising device controls the engine control parameters so that the part of the fuel which is incompletely burned when the fuel is ignited and burned burns by being mixed with the excess oxygen in the cylinder. It discloses that this exhaust temperature raising device controls a fuel injector so that the overall air-fuel ratio in a combustion chamber becomes an air-fuel ratio which is somewhat leaner than the stoichiometric air-fuel ratio.

Japanese Patent Publication No. 2004-124824A discloses an internal combustion engine which is provided with a secondary air feed device wherein the feed of secondary air is prohibited until the temperature of the exhaust port becomes a predetermined temperature or more and thereby the exhaust port is kept from being cooled by the secondary air. Further, this publication discloses that if feeding secondary air immediately after start-up of the internal combustion engine, since the secondary air is low in temperature, the carbon monoxide and hydrocarbons in the exhaust gas do not react by afterburn and the exhaust port ends up being cooled by the low temperature secondary air.

CITATIONS LIST

Patent Literature

PLT 1.Japanese Patent Publication No. 11-324765A
PLT 2.Japanese Patent Publication No. 2001-182586A
PLT 3.Japanese Patent Publication No. 2004-124824A
PLT 4.Japanese Patent Publication No. 2008-088875A
PLT 5.Japanese Patent Publication No. 2004-052602A
PLT 6.Japanese Patent Publication No. 2010-059791A
PLT 7.Japanese Patent Publication No. 2009-024682A
PLT 8.Japanese Patent Publication No. 2004-332558A
PLT 9.Japanese Patent Publication No. 2011-099381A

SUMMARY OF INVENTION

Technical Problem

When warming up an exhaust purification catalyst at the time of start-up of the internal combustion engine etc., it is possible to directly inject fuel into a cylinder and cause stratified combustion with the air-fuel ratio of a combustion chamber in a lean state so as to retard the ignition timing and thereby make the temperature of the exhaust gas rise. Further, it is possible to use a secondary air feed device to feed oxygen into the exhaust gas with the air-fuel ratio of the combustion chamber in a rich state so as to oxidize the unburned hydrocarbons etc. which are contained in the exhaust gas and make the temperature of the exhaust gas rise. By making the temperature of the exhaust gas rise, the exhaust purification catalyst can be made to rise in temperature in a short time.

In this regard, improvement of the properties of the exhaust gas which is discharged into the atmosphere has been demanded. In other words, it is desirable to decrease the amount of discharge into the atmosphere of the hydrocarbons, carbon monoxide, nitrogen oxides, and other components which are contained in the exhaust gas and should be removed. When the temperature of the exhaust purification catalyst sufficiently rises and becomes the activation temperature or more, the exhaust purification catalyst can sufficiently remove hydrocarbons, nitrogen oxides, etc. That is, it is possible to achieve a high removal rate. However, right after cold start of an internal combustion engine etc., there is a low ability to purify the exhaust and the amount of discharge of hydrocarbons etc. becomes greater. For this reason, in particular, it is desirable to decrease the amount of hydrocarbons etc. which are discharged into the atmosphere in the time period when warming up the exhaust purification catalyst. Here, in control for using stratified combustion to greatly retard the ignition timing or in control for using a secondary air feed device to feed oxygen to the exhaust gas, it is possible to promote warm-up of the exhaust purification catalyst and decrease the amount of discharge of the components to be removed, but in recent years it has been desired to decrease the amount of discharge of components to be removed more.

The present invention has as its object to provide an internal combustion engine which is comprised of an exhaust purification catalyst and secondary air feed device where the exhaust purification catalyst is made to rise in temperature in a short time and the amount of discharge of components which are contained in exhaust gas and should be removed is decreased.

Solution to Problem

The internal combustion engine of the present invention comprises an in-cylinder fuel injector which injects fuel to an inside of a combustion chamber, an exhaust purification catalyst which is arranged in an engine exhaust passage, a secondary air feed device which feeds air at an upstream side of the exhaust purification catalyst in the engine exhaust passage, and a control device which controls the in-cylinder fuel injector and secondary air feed device, wherein the control device is formed to be able to perform first catalyst warm-up control and second catalyst warm-up control which promote a temperature rise of the exhaust purification catalyst. The first catalyst warm-up control includes control which injects fuel from the in-cylinder fuel injector in a compression stroke to form a high concentration region where the concentration of fuel at part of the combustion chamber rises and a low concentration region where the concentration of the fuel is lower than the high concentration region and control which retards the ignition timing to make the temperature of the exhaust gas which flows out from the combustion chamber rise. The second catalyst warm-up control includes control which feeds air into the engine exhaust passage to make the components which are contained in the exhaust gas oxidize to make the temperature of the exhaust gas rise. The control device performs the first catalyst warm-up control after start-up of the internal combustion engine and performs control for simultaneously performing the first catalyst warm-up control and the second catalyst warm-up control after performing the first catalyst warm-up control.

In this invention, the engine can further comprise an ignition device which ignites an air-fuel mixture of fuel and air in the combustion chamber, wherein the first catalyst warm-up control can include control which forms a first stratified state where the air-fuel ratio of the combustion chamber as a whole becomes lean and where the air-fuel ratio of the high concentration region becomes rich, and the control for simultaneously performing the first catalyst warm-up control and the second catalyst warm-up control can include control which forms a second stratified state where the air-fuel ratio of the combustion chamber as a whole becomes rich and where the stratification degree is weaker than the first stratified state.

In this invention, the engine can further comprise an operating angle changing mechanism which changes an operating angle of an intake valve, wherein the control device can perform control to switch from the first catalyst warm-up control to the control for simultaneously performing the first catalyst warm-up control and the second catalyst warm-up control and to make the operating angle of the intake valve decrease.

In this invention, the control device can switch the first catalyst warm-up control to the control for simultaneously performing the first catalyst warm-up control and the second catalyst warm-up control in the time period during which the load after start-up of the internal combustion engine is constant.

In this invention, the control device can perform control which switches the first catalyst warm-up control to control for simultaneously performing the first catalyst warm-up control and the second catalyst warm-up control and which makes the amount of fuel which is injected from the in-cylinder fuel injector in the compression stroke decrease.

In this invention, the engine can further comprise an injection pressure changing device which changes an injection pressure of the in-cylinder fuel injector, wherein the control device can perform control which makes the injection pressure of the in-cylinder fuel injector decrease so as to make the amount of fuel which is injected from the in-cylinder fuel injector in the compression stroke decrease.

In this invention, the control device can make the injection timing of the in-cylinder fuel injector in the compression stroke advance when switching from the first catalyst warm-up control to control for simultaneously performing the first catalyst warm-up control and the second catalyst warm-up control.

Advantageous Effects of Invention

According to the present invention, it is possible to provide an internal combustion engine which is provided with an exhaust purification catalyst and secondary air feed device where the exhaust purification catalyst can be raised in temperature in a short time and the amount of discharge of components which are contained in the exhaust gas but which should be removed can be decreased.

DESCRIPTION OF EMBODIMENTS

Embodiment 1

Referring to FIG. 1 to FIG. 6, an internal combustion engine in Embodiment 1 will be explained. In the present embodiment, an internal combustion engine which is mounted in a vehicle will be taken up as an example for the explanation.

Figure 1:
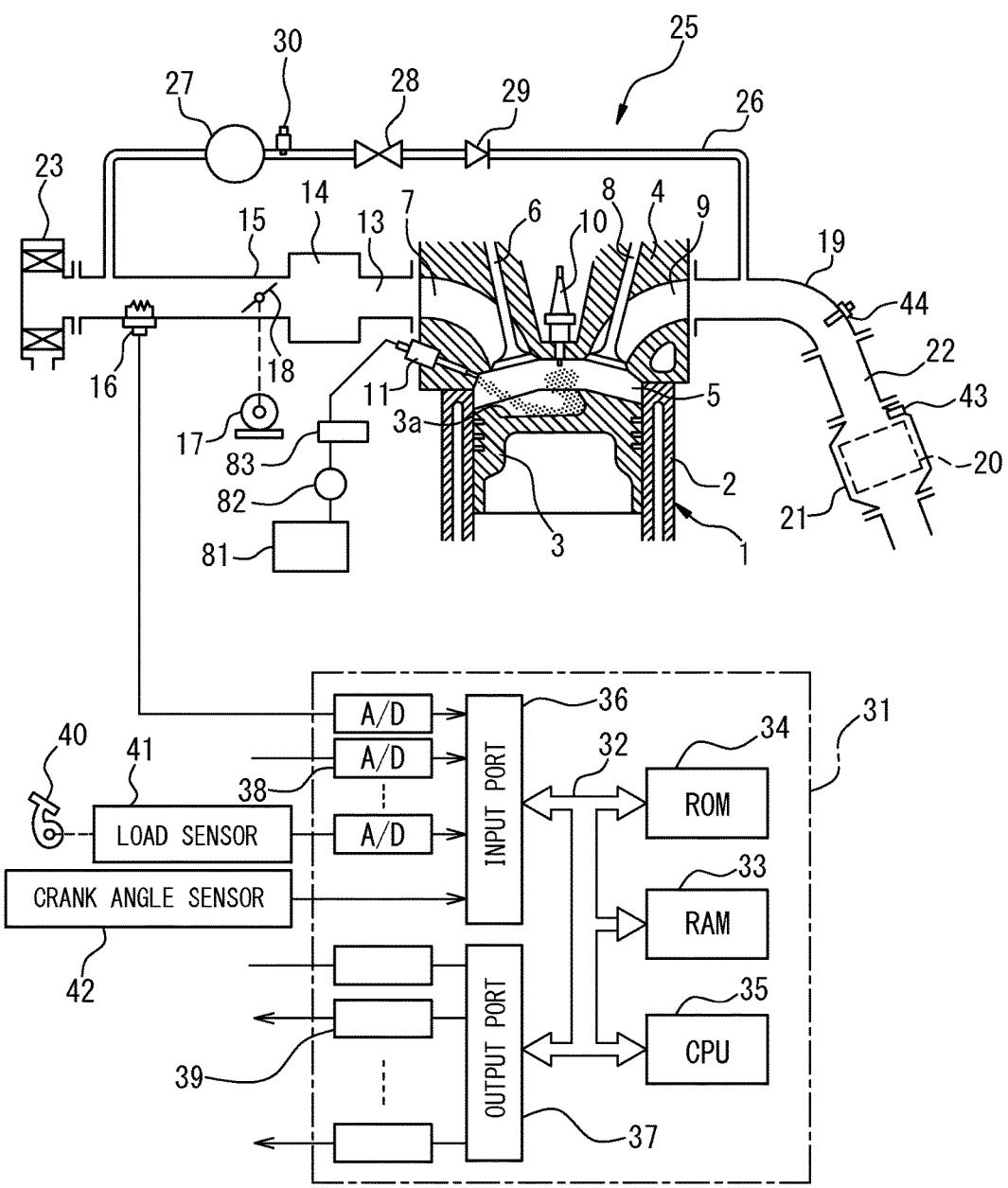
FIG. 1 is a schematic view of an internal combustion engine in an embodiment.

FIG. 1 is a schematic view of an internal combustion engine in the present embodiment. The internal combustion engine in the present embodiment is a spark ignition type. The internal combustion engine is provided with an engine body 1. The engine body 1 includes a cylinder block 2 and a cylinder head 4. At the inside of the cylinder block 2, pistons 3 are arranged. The pistons 3 reciprocate inside bores which are formed in the cylinder block 2.

In the present embodiment, the spaces which are surrounded by the top surfaces of the pistons 3, the cylinder head 4, and the bores of the cylinder block 2 will be referred to as "combustion chambers". A combustion chamber 5 is formed for each cylinder. At each combustion chamber 5, an engine intake passage and engine exhaust passage are connected. The engine intake passage is a passage which feeds air or an air-fuel mixture of fuel and air to the combustion chambers 5. The engine exhaust passage is a passage for discharging the exhaust gas which is produced by combustion of fuel from the combustion chambers 5.

The cylinder head 4 is formed with intake ports 7 and exhaust ports 9. An intake valve 6 is arranged at an end part of each intake port 7 and is formed to be able to open and close the engine intake passage which is communicated with the combustion chamber 5. An exhaust valve 8 is arranged at an end part of each exhaust port 9 and is formed to be able to open and close the engine exhaust passage which is communicated with the combustion chamber 5. The cylinder head 4 has ignition devices, constituted by spark plugs 10, fixed at it.

The internal combustion engine in the present embodiment is provided with in-cylinder fuel injectors which inject fuel to the insides of the combustion chambers 5, constituted by fuel injectors 11. Each fuel injector 11 directly injects fuel into the inside of a cylinder. The internal combustion engine of the present embodiment is provided with a low pressure pump 82 and high pressure pump 83 which feed fuel which is stored in a fuel tank 81 to the fuel injectors 11. At the top surface of each piston 3, a cavity 3a is formed which extends from below a fuel injector 11 to below a spark plug 10. By a fuel injector 11 injecting fuel in the compression stroke, an air-fuel mixture which contains fuel flows along the cavity 3a. The fuel can gather near the spark plug 10 and raise the fuel concentration. For example, by injecting fuel at a predetermined timing, fuel gathers around the spark plug 10 so a high concentration region of a raised concentration of fuel is formed at part of the combustion chamber 5. Around the high concentration region, a low concentration region of a concentration of fuel lower than the high concentration region is formed. That is, it is possible to raise the stratification degree and perform stratified combustion.

The intake port 7 of each cylinder is connected through a corresponding intake runner 13 to a surge tank 14. The surge tank 14 is connected through an intake duct 15 to an air cleaner 23. At the inside of the intake duct 15, an intake air detector which detects the amount of air which is fed to the combustion chamber 5, constituted by an air flowmeter 16, is arranged. Inside the intake duct 15, a throttle valve 18 which is driven by a step motor 17 is arranged.

On the other hand, the exhaust port 9 of each cylinder is connected to an exhaust manifold 19. The exhaust manifold 19 is connected through an exhaust pipe 22 to an exhaust treatment device 21. The exhaust treatment device 21 in the present embodiment includes an exhaust purification catalyst 20. As the exhaust purification catalyst 20, it is possible to employ any catalyst which has an activation temperature for achieving a predetermined removal rate. For example, a three-way catalyst, oxidation catalyst, and, further, $NO_X$ removal catalyst, or other catalyst can be employed.

The internal combustion engine in the present embodiment is provided with an electronic control unit 31 which functions as a control device. The electronic control unit 31 in the present embodiment includes a digital computer. The electronic control unit 31 includes components which are connected with each other through a bidirectional bus 32 such as a RAM (random access memory) 33, ROM (read only memory) 34, CPU (microprocessor) 35, input port 36, and output port 37.

An output signal of the air flowmeter 16 is input to the input port 36 through a corresponding AD converter 38. At an accelerator pedal 40, a load sensor 41 is connected. The load sensor 41 generates an output voltage which is proportional to the amount of depression of the accelerator pedal 40. This output voltage is input through a corresponding AD converter 38 to the input port 36.

A crank angle sensor 42, for example, generates an output pulse every time the crankshaft rotates by a predetermined angle. This output pulse is input to the input port 36. The output of the crank angle sensor 42 enables the engine speed to be detected. Further, the output of the crank angle sensor 42 enables the crank angle at any time to be detected.

If referring to the ratio of the air and fuel (hydrocarbons) in the gas which contains the gas resulting from combustion in the combustion chamber 5 and is fed upstream of the exhaust treatment device 21 in the engine exhaust passage etc. as the "air-fuel ratio (A/F) of the exhaust gas", at the engine exhaust passage, an air-fuel ratio sensor 44 which detects the air-fuel ratio of the exhaust gas is attached. Further, upstream of the exhaust purification catalyst 20, a temperature sensor 43 which detects the temperature of the exhaust gas is arranged. These output of the air-fuel ratio sensor 44 and output of the temperature sensor 43 are input through corresponding AD converters 38 to the input port 36.

The output port 37 of the electronic control unit 31 is connected through the respectively corresponding drive circuits 39 to the fuel injectors 11 and spark plugs 10. Further, the output port 37 of the electronic control unit 31 is connected through the corresponding drive circuits 39 to the low pressure pump 82 and high pressure pump 83. The electronic control unit 31 in the present embodiment is formed so as to perform fuel injection control and ignition control.

In the present embodiment, the timing of injection of fuel from the fuel injector 11 and the amount of injection of fuel are controlled by the electronic control unit 31. The amount of injection of fuel can be adjusted by for example changing the length of time of opening the fuel injector 11. The ignition timing of the spark plug 10 is controlled by the electronic control unit 31. Further, the output port 37 is connected through a corresponding drive circuit 39 to the step motor 17 which drives the throttle valve 18. The step motor 17 is controlled by the electronic control unit 31.

The internal combustion engine of the present embodiment is provided with a secondary air feed device 25 which feeds air to the upstream side from the exhaust purification catalyst 20 in the engine exhaust passage. The secondary air feed device 25 includes a secondary air feed passage 26 which connects the intake duct 15 and the exhaust manifold 19. The secondary air feed passage 26 is connected at the intake duct 15 with the downstream side of the air cleaner 23 and the upstream side of the air flowmeter 16. Further, the secondary air feed device 25 includes an electric motor drive type of air pump 27 and an air switching valve (ASV) 28. The air pump 27 pressurizes the air inside of the intake duct 15 and feeds it to the exhaust manifold 19. Further, in the secondary air feed passage 26, a check valve 29 for preventing backflow of air is arranged. Between the air pump 27 and the air switching valve 28, a pressure detector which detects the pressure inside of the secondary air feed passage 26, constituted by a pressure sensor 30, is arranged.

The output of the pressure sensor 30 is input to the electronic control unit 31. Further, the output port 37 of the electronic control unit 31 is connected through corresponding drive circuits 39 to the air pump 27 and air switching valve 28. In this way, the secondary air feed device 25 is controlled by the electronic control unit 31.

The secondary air feed device 25 in the present embodiment is used at the time of cold start of the internal combustion engine and other conditions when the exhaust purification catalyst 20 has not sufficiently risen in temperature. If the conditions for starting up the secondary air feed device 25 stand, secondary air (AI) is fed to the engine exhaust passage. In the present embodiment, the air switching valve 28 is opened and the air pump 27 is driven. Part of the air which passes through the air cleaner 23 is fed through the secondary air feed passage 26 to the inside of the exhaust manifold 19. Oxygen is fed to the exhaust gas which flows through the exhaust manifold 19.

The exhaust gas which flows out from a combustion chamber 5 contains unburned hydrocarbons and carbon monoxide. The exhaust gas which flows out from a combustion chamber 5 is high in temperature. By using the secondary air feed device to feed oxygen, the unburned hydrocarbons and carbon monoxide can be made to oxidize. Due to the heat of oxidation at this time, the temperature of the exhaust gas can be raised. It is possible to feed the high temperature exhaust gas to the exhaust purification catalyst 20 and possible to promote the temperature rise of the exhaust purification catalyst 20.

Further, when the exhaust purification catalyst 20 has an oxidation function, it is possible to feed air to the exhaust gas so as to make the air-fuel ratio of the exhaust gas lean and feed it to the exhaust purification catalyst 20. In the exhaust purification catalyst 20, the unburned hydrocarbons and carbon monoxide can be oxidized and the rise in temperature of the exhaust purification catalyst 20 can be promoted.

The internal combustion engine in the present embodiment performs control so that the air-fuel ratio at the time of combustion becomes the stoichiometric air-fuel ratio at the time of normal operation after the end of the time of warm-up of the exhaust purification catalyst, warm-up of the engine body, or other warm-up of the internal combustion engine. The control device of the internal combustion engine in the present embodiment performs catalyst warm-up control for promoting a temperature rise of the exhaust purification catalyst 20 at the time of cold start and other times when the exhaust purification catalyst 20 is less than the activation temperature. The catalyst warm-up control includes first catalyst warm-up control and second catalyst warm-up control. Further, the control device of the internal combustion engine of the present embodiment performs control for simultaneously performing the first catalyst warm-up control and the second catalyst warm-up control. In particular, the control device of the present embodiment performs no-load warm-up control, first catalyst warm-up control, and control for simultaneously performing the first catalyst warm-up control and the second catalyst warm-up control in that order. In the present embodiment, these controls are performed during the time period of the idling state where the demand load is zero. Next, the catalyst warm-up control in the present embodiment will be explained.

Figure 2:
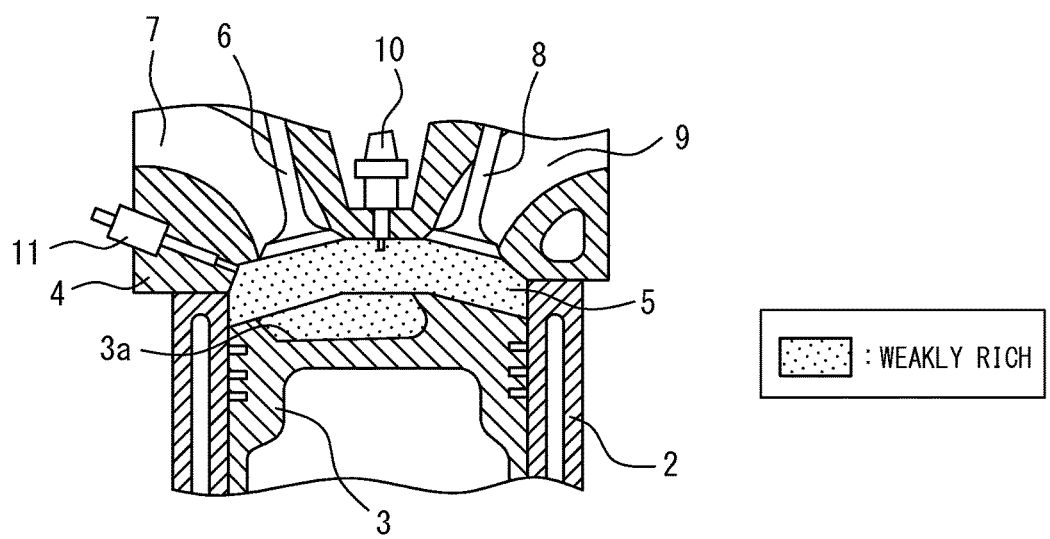
FIG. 2 is a schematic cross-sectional view of a combustion chamber at the time of no-load warm-up control.

FIG. 2 is a schematic cross-sectional view of a combustion chamber 5 at the time of performing no-load warm-up control. In the present embodiment, no-load warm-up control is started along with start-up of the internal combustion engine. In no-load warm-up control, ignition is performed in a homogeneous state where the concentration of the air-fuel mixture in the combustion chamber 5 is uniform. That is, homogeneous combustion is performed in the combustion chamber 5. The combustion cycle of an internal combustion engine includes an intake stroke, compression stroke, expansion stroke, and exhaust stroke. In the present embodiment, the fuel injector 11 injects fuel in the intake stroke and stops the injection of fuel in the compression stroke to form the homogeneous state. The fuel injector 11 feeds fuel so that the air-fuel ratio of the combustion chamber 5 as a whole becomes weakly rich. In this case, the secondary air feed device 25 stops and control for greatly retarding the ignition timing is stopped.

Figure 3:
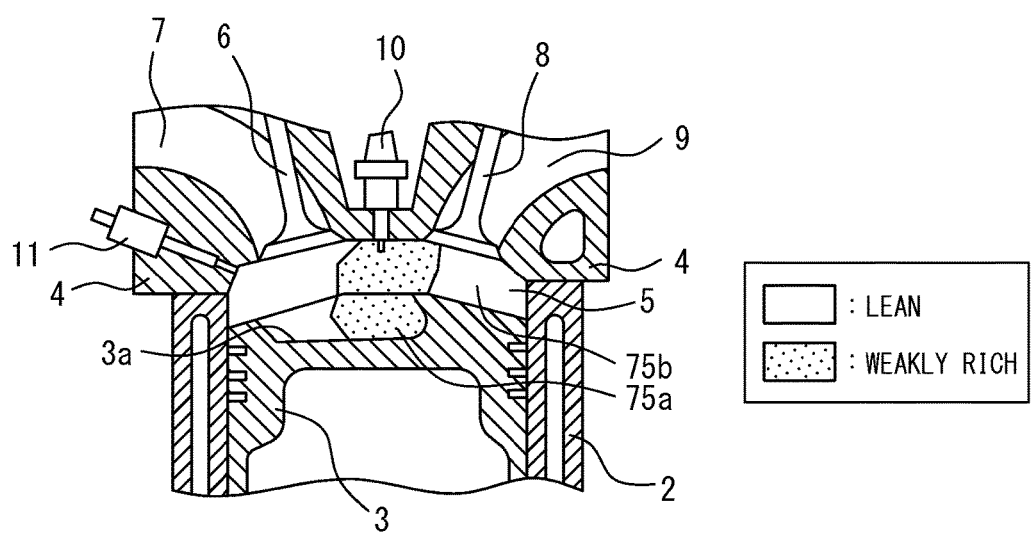
FIG. 3 is a schematic cross-sectional view of a combustion chamber at the time of performing first catalyst warm-up control.

FIG. 3 is a schematic cross-sectional view of a combustion chamber 5 at the time of performing the first catalyst warm-up control. In the present embodiment, no-load warm-up control is switched to the first catalyst warm-up control after the elapse of a predetermined time. The first catalyst warm-up control is control for performing stratified combustion in a combustion chamber 5. The first catalyst warm-up control includes control for performing stratified combustion where the air-fuel ratio of a combustion chamber 5 as a whole becomes rich and further control for performing stratified combustion where the air-fuel ratio of a combustion chamber 5 as a whole becomes lean. In the first catalyst warm-up control, the fuel injector 11 injects fuel in the compression stroke of the combustion cycle. Fuel is injected at the timing when the fuel gathers around the spark plug 10. The fuel concentration around the spark plug 10 rises whereby a high concentration region 75a with a high fuel concentration and a low concentration region 75b with a fuel concentration lower than the high concentration region 75a are formed. The fuel injector 11 injects fuel in the intake stroke in addition to the compression stroke. In this case, the fuel injector 11 injects fuel so that the air-fuel ratio of the combustion chamber 5 as a whole becomes lean (air-fuel ratio becomes larger than stoichiometric air-fuel ratio). The air-fuel ratio of the combustion chamber 5 as a whole corresponds to the average air-fuel ratio when making the air-fuel mixture of the combustion chamber 5 homogeneous. The air-fuel ratio of the high concentration region 75a is rich (air-fuel ratio smaller than stoichiometric air-fuel ratio). The air-fuel ratio of the low concentration region 75b becomes lean. In this way, a stratified state is formed for ignition. That is, stratified combustion is performed in the combustion chamber 5.

By performing stratified combustion in a combustion chamber 5, the ignitable time period becomes longer and the ignition timing can be greatly retarded. In the first catalyst warm-up control, control is performed for greatly regarding the ignition timing. For example, at the time of performing the no-load warm-up control of the present embodiment, further, control is performed for greatly retarding the ignition timing compared with the idling state after the end of warm-up of the internal combustion engine. The ignition timing can, for example, be set from 10° to 20° after compression top dead center (ATDC) in range. By performing control for greatly retarding the ignition timing in this way, it is possible to make the temperature of the exhaust gas which flows out from the combustion chamber 5 greatly rise. Further, when switching the no-load warm-up control to the first catalyst warm-up control, the engine speed is preferably maintained substantially constant. Here, if greatly retarding the ignition timing, the engine speed is decreased. For this reason, in the first catalyst warm-up control, control is performed for retarding the ignition timing and making the amount of intake air increase.

The second catalyst warm-up control is control which feeds air to the upstream side of the exhaust purification catalyst in the engine exhaust passage. The second catalyst warm-up control includes control for feeding air to the engine exhaust passage so as to make components which are contained in the exhaust gas oxidize and make the temperature of the exhaust gas rise. That is, the second catalyst warm-up control includes control for driving the secondary air feed device 25.

Figure 4:
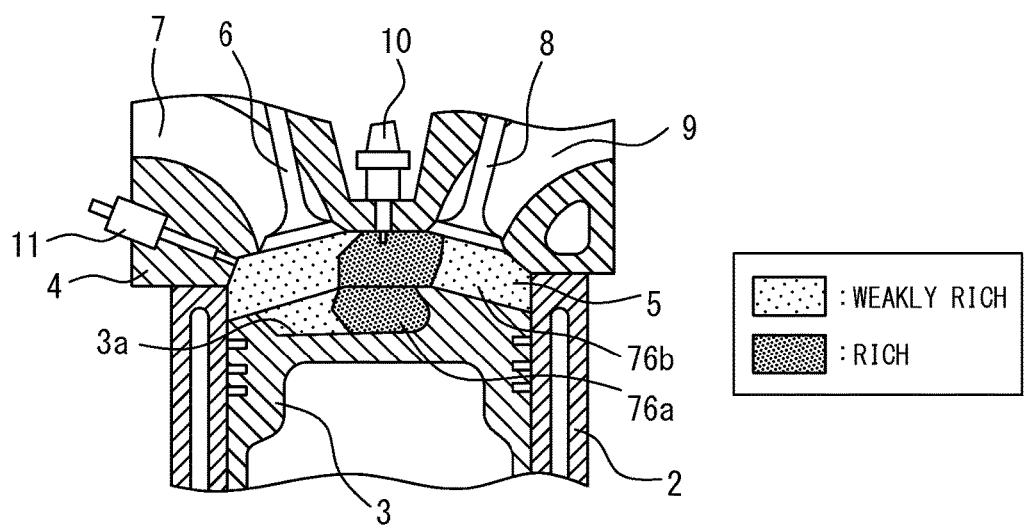
FIG. 4 is a schematic cross-sectional view of a combustion chamber at the time of simultaneously performing first catalyst warm-up control and second catalyst warm-up control.

FIG. 4 is a schematic cross-sectional view of a combustion chamber 5 when performing control for simultaneously performing the first catalyst warm-up control and the second catalyst warm-up control. In the present embodiment, after the elapse of a predetermined time, the first catalyst warm-up control is switched to the control for simultaneously performing the first catalyst warm-up control and the second catalyst warm-up control. In the control for simultaneously performing the first catalyst warm-up control and the second catalyst warm-up control, control for performing stratified combustion in the combustion chamber 5 and greatly retarding the ignition timing and control for feeding secondary air to the engine exhaust passage are simultaneously performed. By driving the secondary air feed device 25, it is possible to feed air to the exhaust manifold 19. It is possible to make the carbon monoxide or hydrocarbons which are contained in the exhaust gas to oxidize and make the temperature of the exhaust gas rise.

When performing the second catalyst warm-up control, the air-fuel ratio of the exhaust gas which flows out from the combustion chamber 5 is preferably rich. If the exhaust gas which flows out from the combustion chamber 5 contains a large amount of unburned hydrocarbons or carbon monoxide, it is possible to increase the amount of oxidation of unburned hydrocarbons and carbon monoxide in the engine exhaust passage and possible to effectively raise the temperature of the exhaust gas. In the control for simultaneously performing the first catalyst warm-up control and the second catalyst warm-up control in the present embodiment, control is performed so that the air-fuel ratio of the combustion chamber 5 as a whole becomes rich. That is, control is performed so that the air-fuel ratio of the exhaust gas which flows out from the combustion chamber 5 becomes rich.

When performing not only control for feeding secondary air, but also control for greatly retarding the ignition timing, stratified combustion is performed. In this regard, in the time period when the air-fuel ratio of the combustion chamber 5 as a whole is rich, if injecting a similar amount of fuel as the first catalyst warm-up control in the compression stroke, the concentration of the air-fuel mixture around the spark plug 10 becomes too high and misfires end up occurring. That is, if the air-fuel ratio of the combustion chamber 5 as a whole is rich and forming a strong stratified state around the spark plug 10, the rich degree becomes too high and the combustion of fuel becomes unstable.

The inventors discovered that when the air-fuel ratio of a combustion chamber 5 as a whole is rich in state, by limiting the fuel which is injected in the compression stroke and weakening the stratification degree around the spark plug 10, it is possible to greatly retard the ignition timing. That is, they discovered that by forming a weak stratified state around the spark plug 10, the ignition timing is greatly retarded.

In control for simultaneously performing the first catalyst warm-up control and the second catalyst warm-up control, in a combustion chamber 5, a high concentration region 76a is formed around the spark plug 10 and a low concentration region 76b is formed at the outside of the high concentration region 76a. The air-fuel ratios of the low concentration region 76b and high concentration region 76a become rich. Here, the stratification degree in the combustion chamber 5 is weaker than the stratification degree in the first catalyst warm-up control. For example, the difference between the air-fuel ratio of the high concentration region 76a and the air-fuel ratio of the low concentration region 76b in the control for simultaneously performing the first catalyst warm-up control and the second catalyst warm-up control is smaller than the difference between the air-fuel ratio of the high concentration region 75a and the air-fuel ratio of the low concentration region 75b in the first catalyst warm-up control. In the control for simultaneously performing the first catalyst warm-up control and the second catalyst warm-up control, by making the amount of injection of fuel in the compression stroke smaller than the first catalyst warm-up control, it is possible to weaken the stratification degree compared with the first catalyst warm-up control.

In the control for simultaneously performing the first catalyst warm-up control and the second catalyst warm-up control, fuel is injected so that the air-fuel ratio at the combustion chamber 5 as a whole becomes rich. At the intake stroke, the fuel injector 11 injects fuel. Further, at the compression stroke, the fuel injector 11 injects fuel. Here, fuel is injected at the compression stroke by the timing and injection amount by which a weak stratified state is formed around the spark plug 10.

In this way, in control for simultaneously performing the first catalyst warm-up control and the second catalyst warm-up control, by forming a weak stratified state, the ignition timing can be greatly retarded and the temperature of the exhaust gas which flows out from the combustion chamber 5 can be raised. Furthermore, by using the secondary air feed device 25 to feed oxygen to the exhaust gas, it is possible to cause an oxidation reaction of the carbon monoxide or unburned hydrocarbons which flows out from the combustion chamber 5 to make the temperature of the exhaust gas rise. The air-fuel ratio of the exhaust gas which flows out from the combustion chamber 5 is rich, so it is possible to oxidize most of the unburned fuel etc. at the engine exhaust passage.

In the control for simultaneously performing the first catalyst warm-up control and the second catalyst warm-up control, high temperature exhaust gas can be fed to the exhaust purification catalyst 20 and the exhaust purification catalyst 20 can be warmed up in a short time. It is possible to shorten the time of the state where the exhaust purification catalyst 20 is less than the activation temperature and possible to shorten the time when the properties of the exhaust gas deteriorate. For this reason, it is possible to decrease the amount of discharge of the components which are contained in the exhaust gas and should be removed. For example, when the exhaust purification catalyst 20 has an oxidation function, it is possible to decrease the amount of discharge of the hydrocarbons or carbon monoxide which are discharged to the outside in the time period of catalyst warm-up control.

Here, the combustion modes in a combustion chamber 5 when performing the no-load warm-up control, the first catalyst warm-up control, and the control for simultaneously performing the first catalyst warm-up control and the second catalyst warm-up control in the present embodiment will be explained in detail. Table 1 shows the combustion modes in the different controls. In Table 1, as a comparative example, the case where the state of the air-fuel mixture of a combustion chamber 5 is the homogeneous state and the air-fuel ratio of the combustion chamber 5 as a whole is a stoichiometric air-fuel ratio is described. In the present embodiment, this combustion mode is referred to as the "homogeneous stoichiometric" state.

TABLE 1

| Control method | Mode of combustion | Air-fuel ratio of combustion chamber as whole | Air-fuel ratio around spark plug |
|---|---|---|---|
| No-load warm-up control | Homogeneous rich | 12 to 13 | 12 to 13 |
| First catalyst warm-up control | Stratified lean | 15 to 16 | 13 to 14 |
| Control for performing first catalyst warm-up control and second catalyst warm-up control simultaneously | Weak stratified rich | 12 to 13 | 8 to 11 |
| Comparative example | Homogeneous stoichiometric | 14.6 | 14.6 |

In no-load warm-up control, the state of the air-fuel mixture of a combustion chamber 5 is a homogeneous state. The air-fuel ratio of the combustion chamber 5 as a whole is rich. In the present embodiment, this combustion mode will be referred to as "homogeneous rich". In control which performs the first catalyst warm-up control and does not perform the second catalyst warm-up control, the state of the air-fuel mixture of the combustion chamber 5 is the "first stratified state. The air-fuel ratio of a combustion chamber 5 as a whole is lean, while the air-fuel ratio around the spark plug 10 is rich. In the present embodiment, this combustion mode is referred to as the "stratified lean". In control for simultaneously performing the first catalyst warm-up control and the second catalyst warm-up control, the state of the air-fuel mixture of the combustion chamber 5 is a second stratified state weaker in stratification degree than stratified lean. The air-fuel ratio of the combustion chamber 5 as a whole and air-fuel ratio around the spark plug 10 become rich. In the present embodiment, this combustion mode is referred to as "weak stratified rich".

If comparing these controls, the air-fuel ratio of a combustion chamber 5 as a whole of the no-load warm-up control can be made substantially the same as the air-fuel ratio of a combustion chamber 5 as a whole of the control for simultaneously performing the first catalyst warm-up control and the second catalyst warm-up control. In this regard, the air-fuel ratio around the spark plug 10 at the time of control for simultaneously performing the first catalyst warm-up control and the second catalyst warm-up control becomes lower than at the time of no-load warm-up control. Furthermore, the air-fuel ratio around the spark plug 10 at the time of control for simultaneously performing the first catalyst warm-up control and the second catalyst warm-up control becomes lower than at the time of the first catalyst warm-up control.

In this way, in control for simultaneously performing the first catalyst warm-up control and the second catalyst warm-up control, the combustion chamber 5 as a whole is made rich, but by forming a weak stratified state, the ignition timing can be greatly retarded. Furthermore, in control for simultaneously performing the first catalyst warm-up control and the second catalyst warm-up control, the air-fuel ratio of the exhaust gas which flows out from the combustion chamber 5 becomes rich. By feeding secondary air to the engine exhaust passage, the temperature of the exhaust gas can be made to further rise. In this way, in the present embodiment, large ignition retardation and a rise of temperature of the exhaust gas due to the feed of secondary air can be simultaneously achieved.

Here, Table 1 describes values of air-fuel ratios of medium size and small size internal combustion engines. For example, an internal combustion engine with a displacement of 3 liters or less corresponds to a medium size or small size internal combustion engine. If becoming a large size internal combustion engine with a displacement larger than 3 liters, sometimes the air-fuel ratio of a combustion chamber 5 as a whole is set to a somewhat rich side. That is, if an internal combustion engine becomes large in size, the ratio is sometimes set so that the concentration of fuel becomes denser. For example, if a six-cylinder or eight-cylinder or other large-size engine, the displacement becomes large. In this case, for example, the air-fuel ratio of the combustion chamber 5 as a whole in the first catalyst warm-up control is set to a region of 14.6 to 16. Further, in control for simultaneously performing the first catalyst warm-up control and the second catalyst warm-up control, the air-fuel ratio of the combustion chamber 5 as a whole is set to 10 to 14.

Further, the rich degree of the air-fuel ratio around a spark plug 10 becomes the following formula (1). The larger the rich degree, the higher the concentration of fuel in the air-fuel mixture around the spark plug 10 and the smaller the air-fuel ratio. The following formula (1) is shown by the air-fuel ratio.

$$\text{Weak stratified rich} < \text{Homogeneous rich} \leq \text{Stratified lean} < \text{Homogeneous stoichiometric} \quad (1)$$

In this regard, when performing the first catalyst warm-up control and the second catalyst warm-up control simultaneously, the exhaust gas which flows out from a combustion chamber 5 becomes rich in air-fuel ratio. In the engine exhaust passage, secondary air is fed and part of the unburned hydrocarbons or carbon monoxide burns, but the exhaust gas which reaches the exhaust purification catalyst 20 contains unburned hydrocarbons and carbon monoxide.

Right after start-up of the internal combustion engine, the exhaust purification catalyst 20 is in a low temperature state. For example, at the time of cold start etc., the temperature of the exhaust purification catalyst 20 is the same as the temperature of the atmosphere around the internal combustion engine. When in the state where the exhaust purification catalyst 20 is low in temperature, if the first catalyst warm-up control is not performed but control for simultaneously performing the first catalyst warm-up control and the second catalyst warm-up control is performed, even if unburned hydrocarbons, carbon monoxide, or other components of the exhaust gas flow in, not much can be removed at all, so the gas is discharged into the atmosphere.

As opposed to this, in the present embodiment, the first catalyst warm-up control is performed, then the first catalyst warm-up control and the second catalyst warm-up control are simultaneously performed. In the first catalyst warm-up control, the exhaust gas which flows out from a combustion chamber 5 is in a state of a lean air-fuel ratio, so unburned hydrocarbons and carbon monoxide can be burned in the engine exhaust passage, that is, a so-called afterburn reaction can be promoted. For this reason, unburned hydrocarbons and carbon monoxide can be kept from flowing into the exhaust purification catalyst 20. Even in the state of low activity of the exhaust purification catalyst 20, unburned hydrocarbons etc. can be kept from being discharged.

By performing the first catalyst warm-up control, the exhaust purification catalyst 20 gradually rises in temperature. If the exhaust purification catalyst 20 rises in temperature, even if less than the activation temperature, a predetermined removal rate can be realized. By starting the control for simultaneously performing the first catalyst warm-up control and the second catalyst warm-up control in the state where a predetermined removal rate can be realized, even unburned hydrocarbons etc. which could not be completely oxidized by feed of secondary air can be removed by the exhaust purification catalyst 20. For this reason, unburned hydrocarbons etc. can be kept from being discharged into the atmosphere.

By performing the first catalyst warm-up control, then performing control for simultaneously performing the first catalyst warm-up control and the second catalyst warm-up control in this way, discharge of hydrocarbons etc. into the atmosphere can be suppressed while the exhaust purification catalyst 20 can be raised in temperature to the activation temperature or more in a short time. For this reason, the exhaust gas which is discharged into the atmosphere can be improved in properties. That is, the amount of the components which are contained in the exhaust gas and should be removed which is discharged into the atmosphere can be decreased. Note that, in the first catalyst warm-up control of the present embodiment, control is performed so that the air-fuel ratio of a combustion chamber as a whole becomes lean and the air-fuel ratio of the high concentration region becomes rich, but the invention is not limited to this. In the combustion chamber, a high concentration region and a low concentration region with a concentration of fuel lower than the high concentration region may be formed. For example, the air-fuel ratio of the high concentration region may be made the stoichiometric air-fuel ratio.

Figure 5:
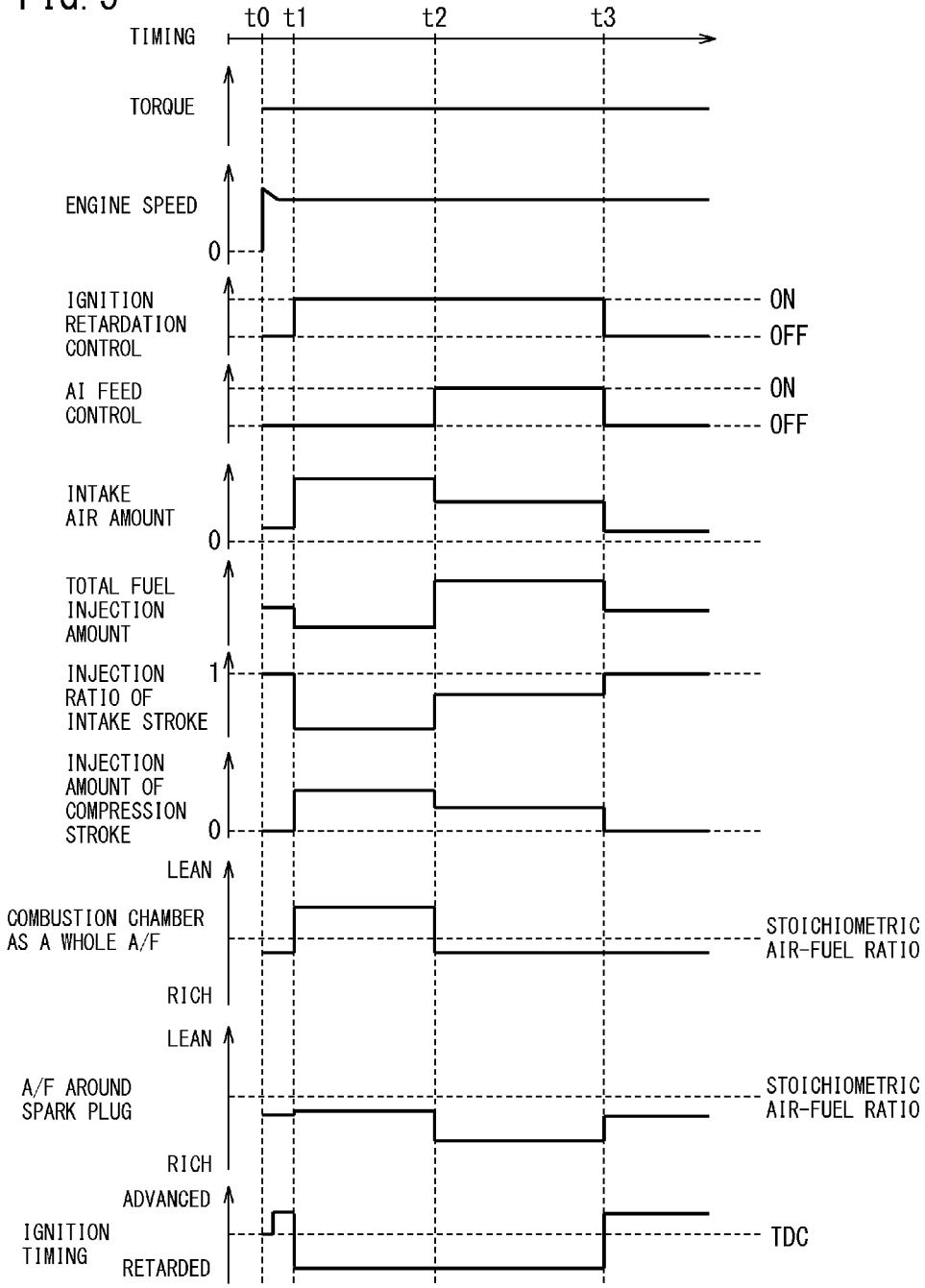
FIG. 5 is a time chart of the time of start-up of the internal combustion engine at Embodiment 1.

FIG. 5 is a time chart of control at the time of start-up of an internal combustion engine in the present embodiment. At the time t0, the internal combustion engine is started up. The engine speed temporarily rises along with start-up of the internal combustion engine. In the present embodiment, control is performed so that after the engine speed temporarily rises, the engine speed is held constant. Further, control is performed so that the torque which the internal combustion engine outputs is held constant. That is, a plurality of types of catalyst warm-up control are performed in the idling state where the demand load is zero.

In the example which is shown in FIG. 5, no-load warm-up control is performed along with start-up of the internal combustion engine. Ignition retardation control for retarding the ignition timing and secondary air feed control for feeding the secondary air are stopped. Control is performed so that in a combustion chamber 5, the air-fuel ratio of the combustion chamber 5 as a whole becomes weakly rich in the state of a homogeneous air-fuel mixture. That is, the mode is controlled to a homogeneous rich combustion mode.

In the no-load warm-up control of the present embodiment, fuel is injected in the intake stroke of the combustion cycle and the injection of fuel in the compression stroke is stopped. Here, the total fuel injection amount is the sum of the amount of fuel which is injected in the intake stroke and the amount of fuel which is injected in the compression stroke. The injection ratio of the intake stroke shows the ratio of fuel which is injected in the intake stroke in the fuel which is injected from a fuel injector 11. In no-load warm-up control, the injection ratio of the intake stroke becomes "1" and the amount of injection in the compression stroke becomes "0". The air-fuel ratio of the combustion chamber 5 as a whole and the air-fuel ratio around the spark plug 10 become the same. The ignition timing is, for example, set to before compression top dead center. In the present embodiment, in no-load warm-up control, the ignition timing is set based on the engine speed and fuel injection amount and other aspects of the operating state.

In the present embodiment, no-load warm-up control is performed for a predetermined time. At the time t1, the no-load warm-up control is switched to the first catalyst warm-up control. At the time t1, ignition retardation control for greatly retarding the ignition timing is performed. On the other hand, in the secondary air feed control for feeding secondary air, the stopped state is maintained. The torque which the internal combustion engine outputs and the engine speed are maintained substantially constant.

The air-fuel ratio of the combustion chamber 5 as a whole changes from the rich state to the lean state. Further, the injection ratio of the intake stroke is lowered and the amount of injection of fuel in the compression stroke is made to increase. Fuel is injected in the compression stroke to form a stratified state. The air-fuel ratio around the spark plug 10 becomes the rich state. In the first catalyst warm-up control, the ignition timing is greatly retarded. For example, in no-load warm-up control, ignition was performed before compression top dead center, but in the first catalyst warm-up control, ignition is performed after the compression top dead center. In the present embodiment, to maintain the engine speed substantially constant even if retarding the ignition timing, the amount of intake air is increased at the time t1.

In the present embodiment, the first catalyst warm-up control is performed for a predetermined time. By performing the no-load warm-up control and the first catalyst warm-up control, it is possible to raise the temperature of the exhaust purification catalyst 20 to a predetermined temperature. The exhaust purification catalyst 20 can remove components in the exhaust by a predetermined removal rate even if the temperature does not reach the activation temperature. The timing for switching from the first catalyst warm-up control to control for simultaneously performing the first catalyst warm-up control and the second catalyst warm-up control can be judged by any control. For example, it is also possible to estimate the temperature of the exhaust purification catalyst 20 and, when the temperature of the exhaust purification catalyst 20 reaches a predetermined temperature judgment value, switch from the first catalyst warm-up control to control for simultaneously performing the first catalyst warm-up control and the second catalyst warm-up control.

At the time t2, the first catalyst warm-up control is switched to control for simultaneously performing the first catalyst warm-up control and the second catalyst warm-up control. While continuing the control for retarding the ignition timing as is, the secondary air feed device 25 is used to feed secondary air to the exhaust manifold 19. Control is performed so that in the combustion chamber 5, the air-fuel ratio of the combustion chamber 5 as a whole becomes rich. Further, fuel is injected in the compression stroke so as to form a weak stratified state around the spark plug 10.

In the example which is shown in FIG. 5, at the time t2, the total fuel injection amount is increased. Further, at the time t2, the injection ratio of the intake stroke is made to rise. The amount of injection of fuel in the compression stroke is made to decrease. In the present embodiment, the opening time of the fuel injector 11 is made to decrease so as to make the amount of injection of fuel at the compression stroke decrease. Further, in the present embodiment, to keep the increase of fuel which is fed into the combustion chamber 5 from causing the engine speed to increase, the amount of intake air is decreased. At the time t2, the air-fuel ratio of the combustion chamber 5 as a whole changes from lean to rich. The air-fuel ratio around the spark plug 10 falls.

In this way, at the time t2, the first catalyst warm-up control can be switched to control for simultaneously performing the first catalyst warm-up control and the second catalyst warm-up control. The control for simultaneously performing the first catalyst warm-up control and the second catalyst warm-up control can be ended when the exhaust purification catalyst 20 rises to the predetermined temperature or more. For example, the control for simultaneously performing the first catalyst warm-up control and the second catalyst warm-up control can be ended when the exhaust purification catalyst 20 becomes the activation temperature or more. Alternatively, it is possible to calculate the cumulative value of the intake air amount from the time of start-up of the internal combustion engine and judge that the exhaust purification catalyst 20 has reached a temperature of the activation temperature or more when the cumulative value of the intake air amount exceeds a predetermined judgment value. Further, it is possible to end the control after the elapse of a predetermined time.

At the time t3, the control for simultaneously performing the first catalyst warm-up control and the second catalyst warm-up control is ended. In the present embodiment, after the end of the control for simultaneously performing the first catalyst warm-up control and the second catalyst warm-up control, no-load warm-up control is performed. At the time t3, the control for retarding the ignition timing and the control for feeding the secondary air are stopped. The control after the end of the control for simultaneously performing the first catalyst warm-up control and the second catalyst warm-up control is not limited to this. It is also possible to perform no-load control at the time of normal operation where the air-fuel ratio of the combustion chamber 5 as a whole is controlled to the stoichiometric air-fuel ratio.

Figure 6:
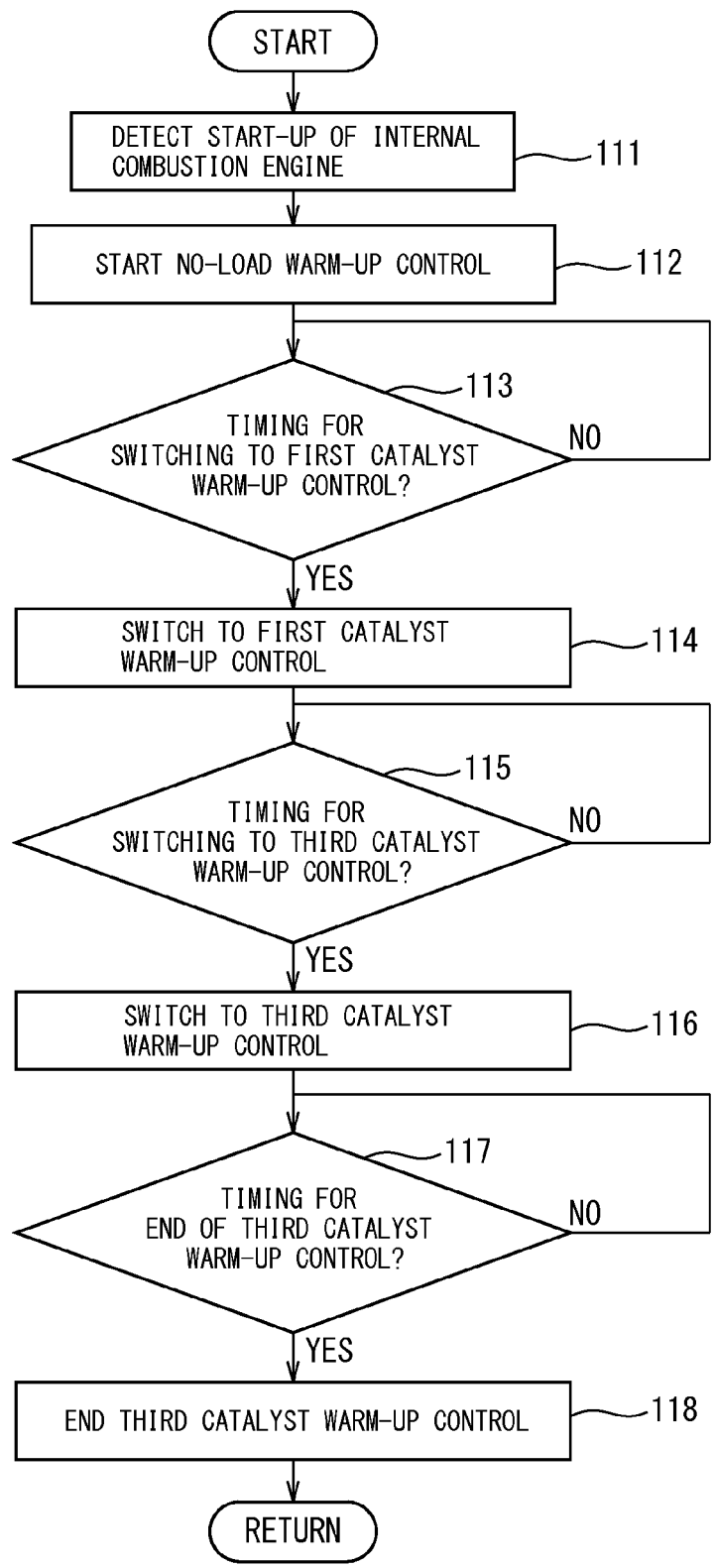
FIG. 6 is a flow chart of the time of start-up of the internal combustion engine at Embodiment 1.

FIG. 6 is a flow chart of operational control at the time of start-up in the present embodiment. In the flow chart which is shown in FIG. 6, control for simultaneously performing the first catalyst warm-up control and the second catalyst warm-up control will be referred to as the "third catalyst warm-up control".

At step 111, start-up of the internal combustion engine is detected, while at step 112, no-load warm-up control is started. Note that, after start-up of the internal combustion engine, it is also possible to perform control which estimates the temperature of the exhaust purification catalyst 20 and prohibits the catalyst warm-up control when the temperature of the exhaust purification catalyst 20 is a predetermined temperature or more.

Next, at step 113, it is judged if it is the timing for switching from no-load warm-up control to the first catalyst warm-up control. When, at step 113, it is not the timing for switching to the first catalyst warm-up control, the no-load warm-up control is continued. When, at step 113, it is the timing for switching to the first catalyst warm-up control, the routine proceeds to step 114. At step 114, the no-load warm-up control is switched to the first catalyst warm-up control. That is, the first catalyst warm-up control is started.

Next, at step 115, it is judged if it is the timing for switching to control for simultaneously performing the first catalyst warm-up control and the second catalyst warm-up control, that is, the third catalyst warm-up control. In the example which is shown in FIG. 6, it is judged if the time during which the first catalyst warm-up control is being performed is a predetermined time or more. When the time during which the first catalyst warm-up control is being performed is a predetermined time or more, it can be judged that it is the timing for switching. When, at step 115, it is not the timing for switching from the first catalyst warm-up control to the third catalyst warm-up control, the first catalyst warm-up control is continued. If, at step 115, it is the timing for switching to the third catalyst warm-up control, the routine proceeds to step 116. At step 116, the first catalyst warm-up control is switched to the third catalyst warm-up control.

Next, at step 117, it is judged if it is the timing for end of the third catalyst warm-up control. In the example which is shown in FIG. 6, it is judged if a predetermined time has elapsed from when starting the third catalyst warm-up control. If performing the third catalyst warm-up control during the predetermined time, it can be judged that it is the timing for end of the third catalyst warm-up control. When, at step 117, it is not the timing for end of the third catalyst warm-up control, the third catalyst warm-up control is continued. If, at step 117, it is the timing for end of the third catalyst warm-up control, the routine proceeds to step 118

At step 118, the third catalyst warm-up control is ended. That is, the control for simultaneously performing the first catalyst warm-up control and the second catalyst warm-up control is ended. In the present embodiment, the control for warming up the exhaust purification catalyst is ended and, for example, no-load warm-up control is shifted to.

In the present embodiment, no-load warm-up control is performed after start-up of the internal combustion engine, but the invention is not limited to this. It is also possible not to perform no-load warm-up control, but to perform the first catalyst warm-up control right after start-up of the internal combustion engine and, after that, switch to control for simultaneously performing the first catalyst warm-up control and the second catalyst warm-up control.

In the present embodiment, an internal combustion engine which is provided with a direct injection type fuel injector which injects fuel directly to the inside of a combustion chamber was illustrated, but the invention is not limited to this. The internal combustion engine may also be provided with a fuel injector which injects fuel into the engine intake passage in addition to a direct injection type of fuel injector. That is, the internal combustion engine may be provided with a fuel injector which performs port injection in addition to a direct injection type of fuel injector.

In the case of an internal combustion engine which is provided with a fuel injector which performs port injection, instead of injecting fuel in the intake stroke, fuel can be injected from the fuel injector which performs port injection. By injecting fuel in the engine intake passage, it is possible to form a homogeneous state of the air-fuel mixture in a combustion chamber. For example, in control for simultaneously performing the first catalyst warm-up control and the second catalyst warm-up control, it is possible to inject fuel from a direct injection type fuel injector in the compression stroke and further inject fuel from the fuel injector which performs port injection to perform control so that the combustion chamber as a whole becomes rich to thereby form a weak stratified rich combustion state.

Further, in the present embodiment, the first catalyst warm-up control is performed, then the control for simultaneously performing the first catalyst warm-up control and the second catalyst warm-up control is performed, but the invention is not limited to this. It is also possible to perform control for simultaneously performing the first catalyst warm-up control and the second catalyst warm-up control, then perform the first catalyst warm-up control.

Embodiment 2

Referring to FIG. 7 to FIG. 15, an internal combustion engine in Embodiment 2 will be explained. As explained in Embodiment 1, in control for simultaneously performing the first catalyst warm-up control and the second catalyst warm-up control, even if further performing stratified combustion in the state of a rich air-fuel ratio of a combustion chamber 5 as a whole, it is possible to form a weak stratified state and thereby avoid misfires and continue burning the fuel.

In this regard, in control for simultaneously performing the first catalyst warm-up control and the second catalyst warm-up control, ignition is greatly retarded, then secondary air is fed to the engine exhaust passage. For this reason, the pressure of the engine exhaust passage becomes higher. If the pressure of the engine exhaust passage becomes higher, the amount of exhaust gas remaining in the combustion chamber 5 increases. That is, the amount of internal EGR (exhaust gas recirculation) increases. If the amount of internal EGR increases, the combustion ability deteriorates. When switching from the first catalyst warm-up control to control for simultaneously performing the first catalyst warm-up control and the second catalyst warm-up control, the amount of internal EGR increases and the combustion ability deteriorates. Therefore, in the internal combustion engine of the present embodiment, when switching from the first catalyst warm-up control to control for simultaneously performing the first catalyst warm-up control and the second catalyst warm-up control, control is performed to further stabilize the combustion ability of fuel at the combustion chamber 5.

Figure 7:
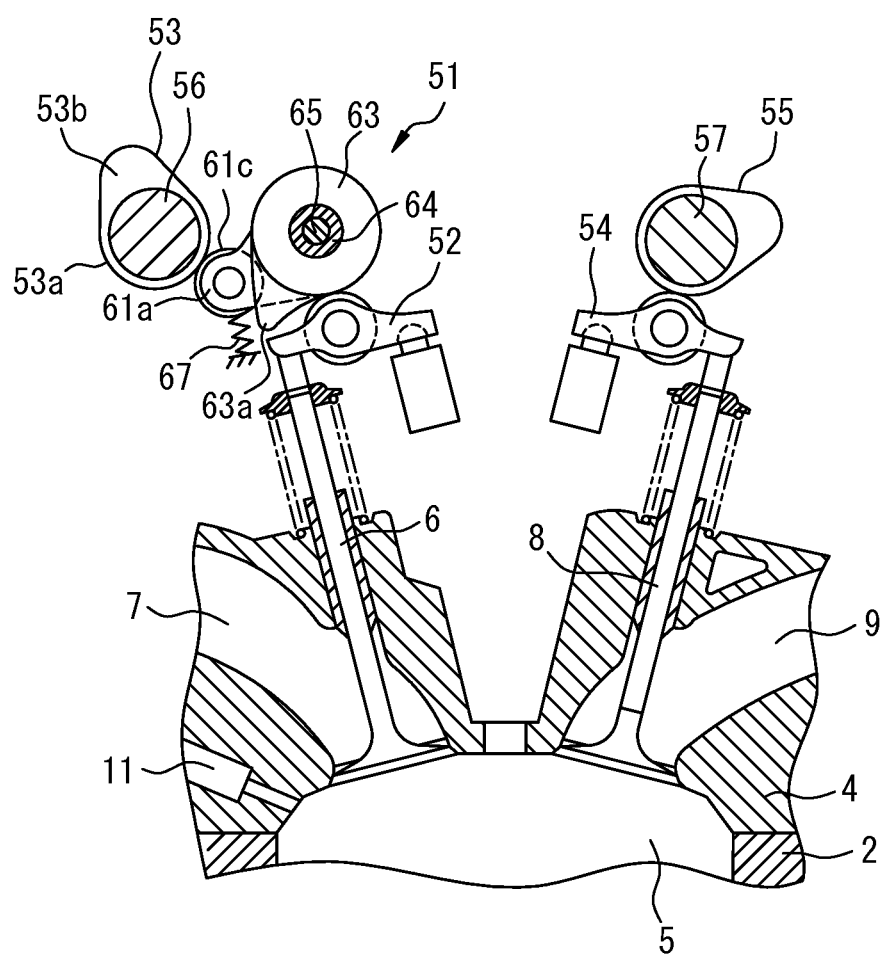
FIG. 7 is a schematic cross-sectional view of the parts of the intake valve and exhaust valve which explain an operating angle changing mechanism at Embodiment 2.

FIG. 7 is a schematic cross-sectional view of a valve drive device which drives an intake valve and exhaust valve of the present embodiment. The internal combustion engine in the present embodiment is provided with an operating angle changing mechanism 51 which changes the operating angle of the intake valve 6. The intake cam 53 is attached to an intake cam shaft 56. The intake valve 6 is driven by the intake cam 53 through a rocker arm 52 and operating angle changing mechanism 51. An exhaust cam 55 is attached to an exhaust camshaft 57. The exhaust valve 8 is driven by an exhaust cam 55 through the rocker arm 54.

Figure 8:
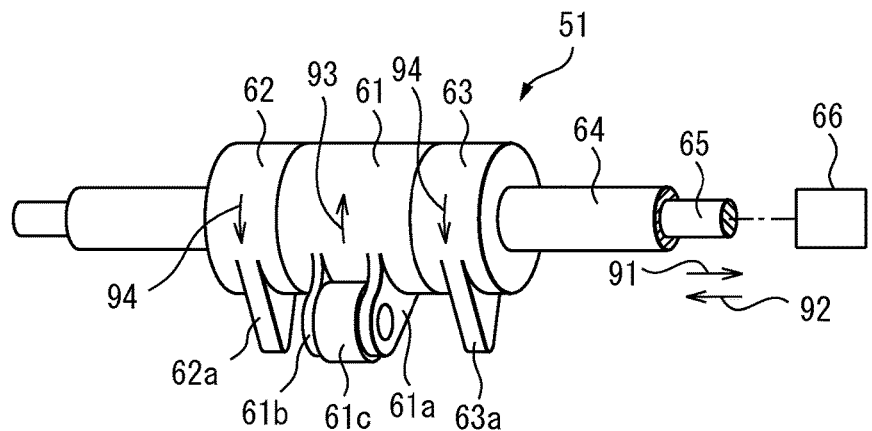
FIG. 8 is a schematic perspective view of an operating angle changing mechanism.

FIG. 8 is a schematic perspective view of the operating angle changing mechanism 51 in the present embodiment. In the internal combustion engine of the present embodiment, two intake valves are arranged at one cylinder. FIG. 8 illustrates an operating angle changing mechanism 51 which drives the two intake valves at the one cylinder. Referring to FIG. 7 and FIG. 8, the operating angle changing mechanism 51 includes a cylindrical input part 61, a cylindrical rocking cam 62 which is arranged at one end of the input part 61, and a cylindrical rocking cam 63 which is arranged at the other side of the input part 61. The input part 61 and rocking cams 62 and 63 are respectively supported by the support pipe 64. The input part 61 and rocking cams 62 and 63 are formed to be able to rotate about the support pipe 64.

The support pipe 64 has a cylindrical through bore which extends in the axial direction. In this through bore, a control shaft 65 is inserted. The control shaft 65 is formed to be able to slide in the through bore of the support pipe 64 in the axial direction of the support pipe 64. At one end part of the control shaft 65, an electric actuator 66 is connected. The electric actuator 66 is formed so that the control shaft 65 is made to move relative to the support pipe 64. The electric actuator 66 is controlled by the electronic control unit 31. That is, the operating angle changing mechanism 51 is controlled by the electronic control unit 31.

The input part 61 has arms 61a and 61b which stick out toward the outside. Between the arms 61a and 61b, a roller 61c is arranged. The roller 61c is pushed against the cam face 53a of the intake cam 53. The input part 61 rotates about the support pipe 64 in accordance with the shape of the cam face 53a. On the other hand, the rocking cams 62 and 63 have noses 62a and 63a which stick out toward the outsides. The noses 62a and 63a are formed to be able to abut against the rocker arm 52.

Between the input part 61 and rocking cams 62 and 63 and the control shaft 65, a drive mechanism is arranged. This drive mechanism is formed so that if the control shaft 65 moves relative to the support pipe 64 as shown by the arrows 91 and 92, the input part 61 and the rocking cams 62 and 63 rotate in opposite directions to each other. For example, if the control shaft 65 is made to move with respect to the support pipe 64 in the direction which is shown by the arrow 91, the input part 61 rotates in a direction which is shown by the arrow 93, while the rocking cams 62 and 63 rotate in the direction which is shown by the arrow 94. If making the control shaft 65 move with respect to the support pipe 64 in the direction which is shown by the arrow 92, the input part 61 rotates in the opposite direction from the direction which is shown by the arrow 93 and the rocking cams 62 and 63 rotate in a direction opposite to the direction which is shown by the arrow 94. In this way, the operating angle changing mechanism 51 in the present embodiment can change the relative angle between the roller 61c of the input part 61 and the noses 62a and 63a of the rocking cams 62 and 63.

Referring to FIG. 7, the roller 61c is biased by a spring 67 toward the intake cam 53. If the intake cam 53 rotates, the cam nose 53b pushes against the roller 61c of the input part 61 and the input part 61 rotates. In this way, the rocking cams 62 and 63 rotate together with the input part 61. By the rocking cams 62 and 63 rotating, the noses 62a and 63a push against the rocker arm 52. The intake valve 6 moves by being pushed against the rocker arm 52 whereby the intake valve 6 opens.

Here, the amount of movement of the intake valve 6 when pushed against the rocker arm 52 changes depending on the relative angle between the roller 61c and noses 62a and 63a about the shaft. If the relative angle of the roller 61c and the noses 62a and 63a becomes greater, the time period during which the noses 62a and 63a push against the intake valve 6 becomes longer and the amount of movement becomes greater. That is, when viewed from the side, if the distance between the front end of the roller 61c and the front ends of the noses 62a and 63a becomes longer, the operating angle of the intake valve 6 becomes greater and the amount of movement of the intake valve 6 also becomes greater. As opposed to this, if the relative angle between the roller 61c and noses 62a, 63a becomes smaller, the operating angle of the intake valve 6 becomes smaller and the amount of lift of the intake valve 6 becomes smaller.

If the operating angle changing mechanism 51 of the present embodiment makes the control shaft 65 move in the direction which is shown by the arrow 91, the operating angle of the intake valve 6 becomes larger and the amount of movement (amount of lift) of the intake valve 6 can be made larger. Further, if making the control shaft 65 move in the direction which is shown by the arrow 92, the operating angle of the intake valve 6 becomes smaller and the amount of movement (amount of lift) of the intake valve 6 becomes smaller.

Figure 9:
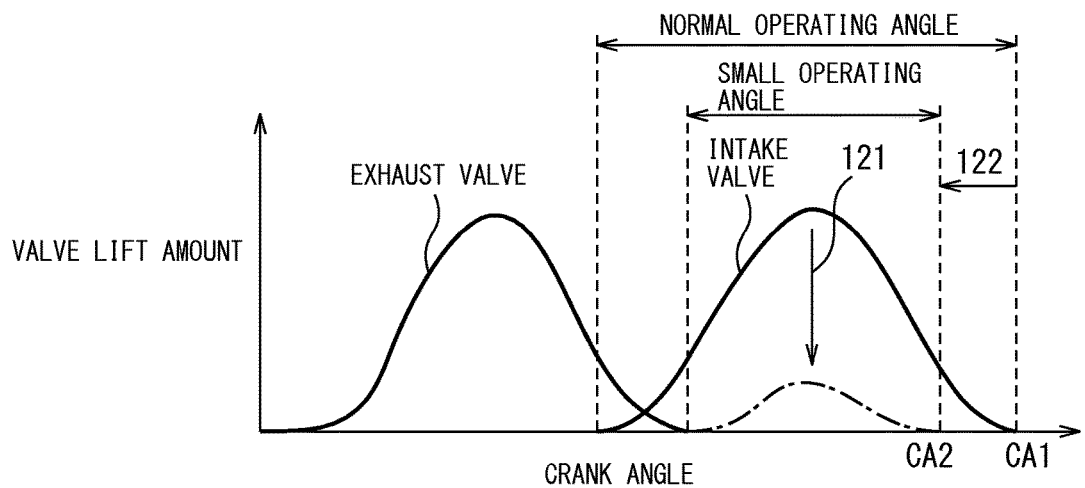
FIG. 9 is a graph of the crank angle and valve lift amount at Embodiment 2.

FIG. 9 is a graph which explains the function of the operating angle changing mechanism 51 in the present embodiment. The abscissa is the crank angle, while the ordinate is the amount of movement of the intake valve or exhaust valve. In the graph of the intake valve, the case of the normal operating angle is shown by the solid line, while the case of a small operating angle where the operating angle is made small is shown by the one-dot chain line. The operating angle is a range of crank angle in the time period during which the intake valve or exhaust valve is opened. In the case of a normal operating angle, the intake value is closed at the crank angle CA1. On the other hand, in the case of a small operating angle, the intake valve is closed at the crank angle CA2.

The operating angle changing mechanism 51 can, as shown by the arrow 121, change the normal operating angle to a small operating angle. By changing the normal operating angle to a small operating angle, as shown by the arrow 122, the closing timing of the intake valve can be advanced.

In the present embodiment, when changing from the first catalyst warm-up control to control for simultaneously performing the first catalyst warm-up control and the second catalyst warm-up control, control for making the operating angle of the intake valve 6 decrease is performed. By making the operating angle of the intake valve 6 decrease, the closing timing of the intake valve 6 is advanced. In the present embodiment, the closing timing of the intake valve 6 is advanced. The intake valve 6 is closed near where the piston 3 is positioned at bottom dead center. By the closing timing of the intake valve becoming faster, it is possible to raise the actual compression ratio in a combustion chamber 5. It is possible to make the temperature of the combustion chamber 5 when the piston 3 reaches top dead center rise. That is, it is possible to make the compression end temperature rise. As a result, it is possible to stabilize combustion at the combustion chamber 5.

Figure 10:
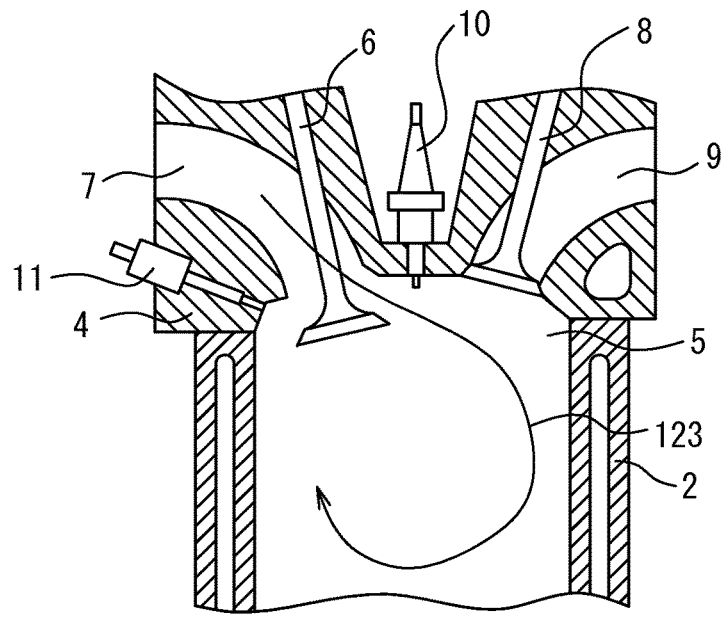
FIG. 10 is a schematic cross-sectional view of a combustion chamber when driving an intake valve by a normal operating angle.

FIG. 10 is a schematic cross-sectional view of a combustion chamber 5 when driving the intake valve 6 by a normal operating angle. FIG. 10 shows the state when the intake valve 6 has moved the most. At a normal operating angle, the amount of movement of the intake valve 6 is large, so the flow sectional area of the flow path over the sides of the head part of the intake valve 6 and into the combustion chamber 5 becomes larger. For this reason, in the combustion chamber 5, as shown by the arrow 123, a tumble flow is formed. A tumble flow has the action of obstructing the flight of fuel spray which is injected from the fuel injector 11 in the second half of the compression stroke. That is, the tumble flow stirs up the air-fuel mixture inside the combustion chamber 5. As a result, formation of a stratified state in the combustion chamber 5 is obstructed.

Figure 11:
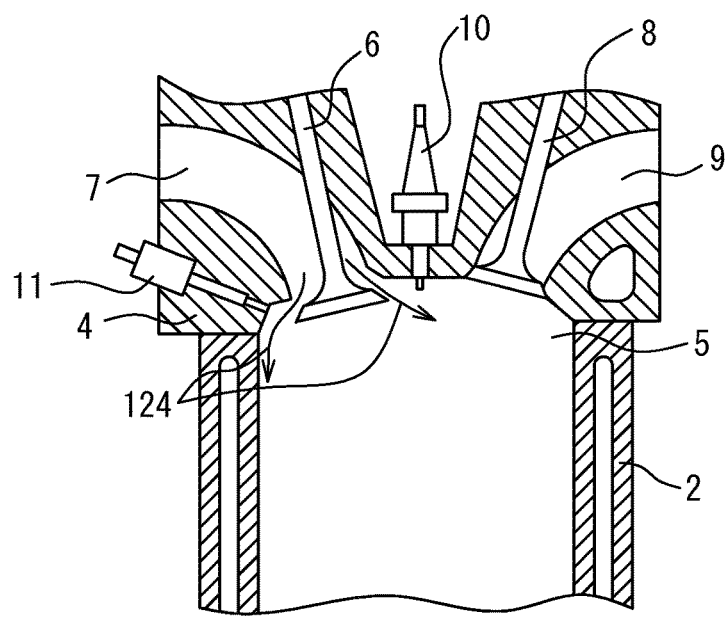
FIG. 11 is a schematic cross-sectional view of a combustion chamber when decreasing an operating angle to drive an intake valve.

FIG. 11 is a schematic cross-sectional view of a combustion chamber 5 in the case of driving the intake valve 6 by a small operating angle. FIG. 11 shows the state where the intake valve 6 has moved the most. The amount of movement of the intake valve 6 becomes smaller, so the flow path between the outlet of the intake port 7 and the head part of the intake valve 6 becomes smaller. The flow sectional area of the flow path over the sides of the head part of the intake valve 6 and into the combustion chamber 5 becomes smaller. For this reason, the air which flows in from the intake port 7, as shown by the arrow 124, disperses in various directions whereby the occurrence of tumble flow is suppressed.

Furthermore, if driving the intake valve 6 by a small operating angle, as shown in FIG. 9, a state is reached where overlap of the intake valve 6 and exhaust valve 8 is avoided. The intake valve 6 opens during the time period when the piston 3 descends. When the intake valve 6 opens, a combustion chamber 5 becomes a negative pressure, so air flows in from the intake port 7 at a high speed in a short time. Due to this flow of air, the occurrence of a tumble flow is further suppressed.

By making the operating angle of the intake valve smaller in this way, it is possible to suppress the tumble flow which occurs in a combustion chamber 5. As a result, when injecting fuel from a fuel injector 11 in the compression stroke, the flight of the fuel spray is kept from being obstructed and the desired stratified state can be formed. As a result, combustion in the combustion chamber 5 can be stabilized.

Figure 12:
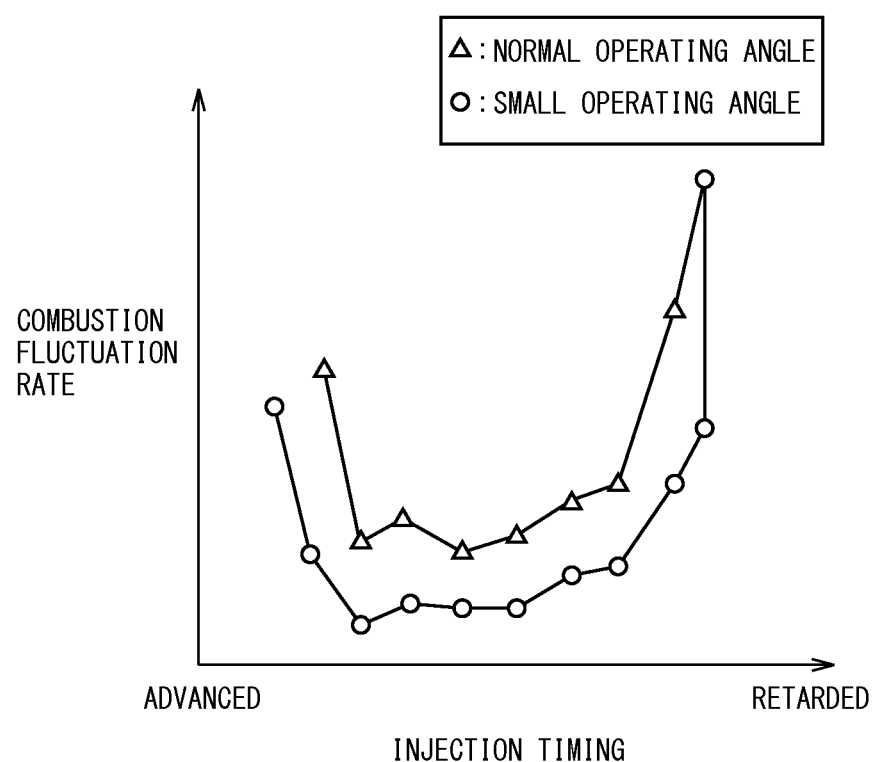
FIG. 12 is a graph which explains a combustion fluctuation rate when making an operating angle of the intake valve change.

FIG. 12 shows a graph of the combustion fluctuation rate when making the operating angle of the intake valve 6 change. The abscissa is the injection timing of fuel, while the ordinate is the combustion fluctuation rate. The smaller the combustion fluctuation rate becomes, the smaller the variation in combustion at the respective combustion cycles and the combustion of fuel stabilizes. It is learned that in a broad range of the injection timing, driving the intake valve 6 by a small operating angle results in a smaller combustion fluctuation rate compared with driving the intake valve 6 by an ordinary operating angle. That is, it is learned that by decreasing the operating angle, the combustion stabilizes.

Next, in the present embodiment, when switching from the first catalyst warm-up control to control for simultaneously performing the first catalyst warm-up control and the second catalyst warm-up control, to stabilize the combustion ability of fuel in a combustion chamber 5, control for advancing the injection timing of fuel in the compression stroke is performed.

Figure 13:
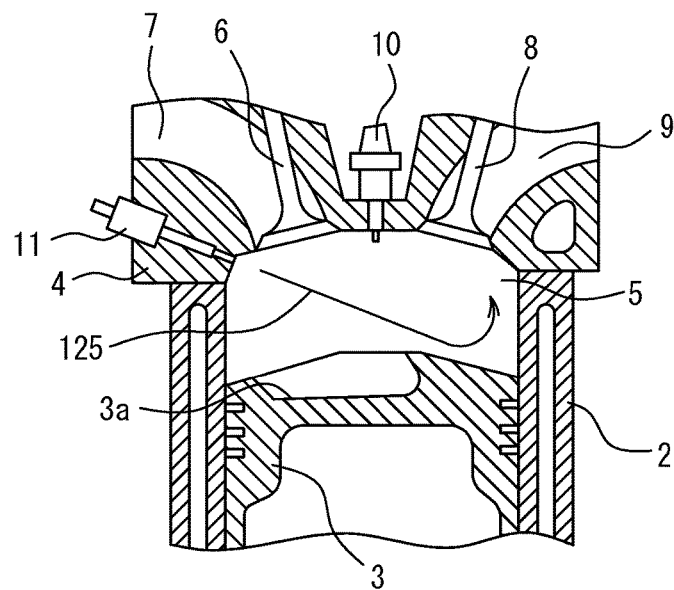
FIG. 13 is a schematic cross-sectional view of a combustion chamber when advancing an injection timing of fuel at Embodiment 2.
Figure 14:
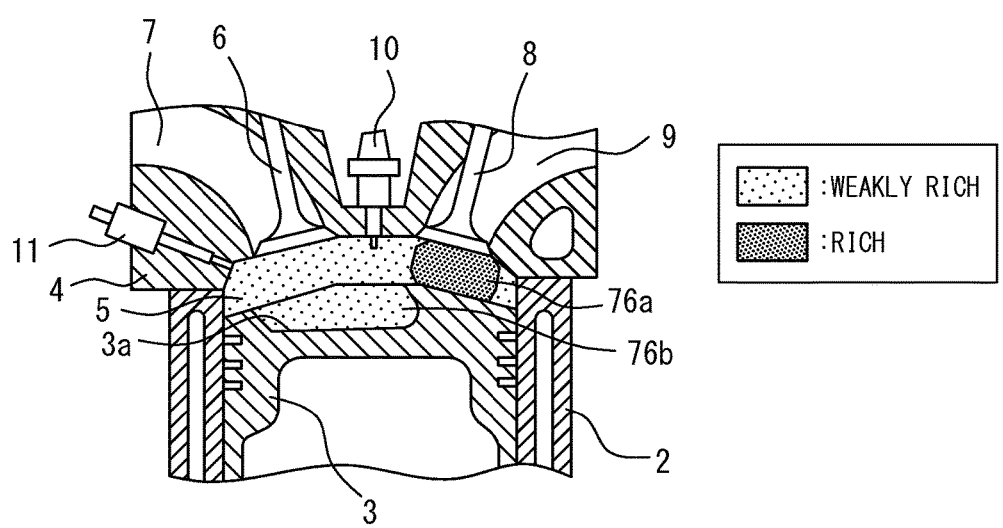
FIG. 14 is another schematic cross-sectional view of a combustion chamber when advancing an injection timing of fuel at Embodiment 2.

FIG. 13 is a schematic cross-sectional view of a combustion chamber 5 which explains another control for stabilizing combustion. FIG. 14 shows another schematic cross-sectional view of a combustion chamber 5 which explains another control for stabilizing combustion. FIG. 14 is a schematic cross-sectional view which explains the state of the combustion chamber 5 when using a spark plug 10 for ignition. When the majority of the fuel which is injected from a fuel injector 11 strikes the cavity 3*a*, the fuel gathers around the spark plug 10.

Referring to FIG. 13, in other control for stabilizing combustion, the injection timing of fuel in the compression stroke is advanced. By advancing the injection timing of fuel, as shown by the arrow 125, at least part of the fuel strikes the top surface of the piston 3 while avoiding the cavity 3*a* of the piston 3. As a result, as shown in FIG. 14, it is possible to make the fuel gather at a position away from the spark plug 10. It is possible to shift the position of the spark plug 10 from the center part of the high concentration region 76*a* where the concentration of fuel is high. By performing this control, it is possible to keep the concentration of fuel around the spark plug 10 from becoming too high. It is possible to easily weaken the stratification degree around the spark plug 10 whereby the combustion of fuel becomes stable at the combustion chamber 5.

Note that, in the control which advances the injection timing of the fuel injector 11, it is also possible to form a reverse stratified state which forms a low concentration region around the spark plug 10 and forms a high concentration region at the periphery of the combustion chamber 5.

Next, in the present embodiment, when switching from the first catalyst warm-up control to control for simultaneously performing the first catalyst warm-up control and the second catalyst warm-up control, to stabilize the combustion ability of the fuel in the combustion chamber 5, control which lowers the injection pressure of the fuel injector 11 is performed.

Referring to FIG. 1, the internal combustion engine of the present embodiment uses a high pressure pump 83 to feed fuel to a fuel injector 11. When switching to control for simultaneously performing the first catalyst warm-up control and the second catalyst warm-up control, control which lowers the pressure of fuel which is fed to the fuel injector 11 can be performed. That is, in control for simultaneously performing the first catalyst warm-up control and the second catalyst warm-up control, control which lowers the pressure of fuel which is injected from a fuel injector 11 below the pressure in the first catalyst warm-up control can be performed.

The internal combustion engine of the present embodiment is provided with an injection pressure changing device which changes the injection pressure of a fuel injector 11. In the present embodiment, a control pulse signal from the electronic control unit 31 is used to drive the high pressure pump 83. The electronic control unit 31 changes the duty ratio of the control pulse signal (ratio of time when signal is on to total time of time when signal is on and time when it is off) so as to adjust the discharge pressure of the high pressure pump 83. The control for lowering the pressure of the fuel which is fed to the fuel injector 11 is not limited to this. Any device or control can be employed.

By performing control for making the pressure of the fuel which is injected from the fuel injector 11 fall, it is possible to reduce the injection amount of fuel even if the length of time during which the fuel injector 11 is open is the same. Further, injection of a small amount of fuel becomes possible. Further, since the injection pressure is small, the penetration force of the spray of the fuel is reduced and the stratification degree becomes weaker. In this way, the state of a weak stratified can be easily formed and combustion can be stabilized.

Figure 15:
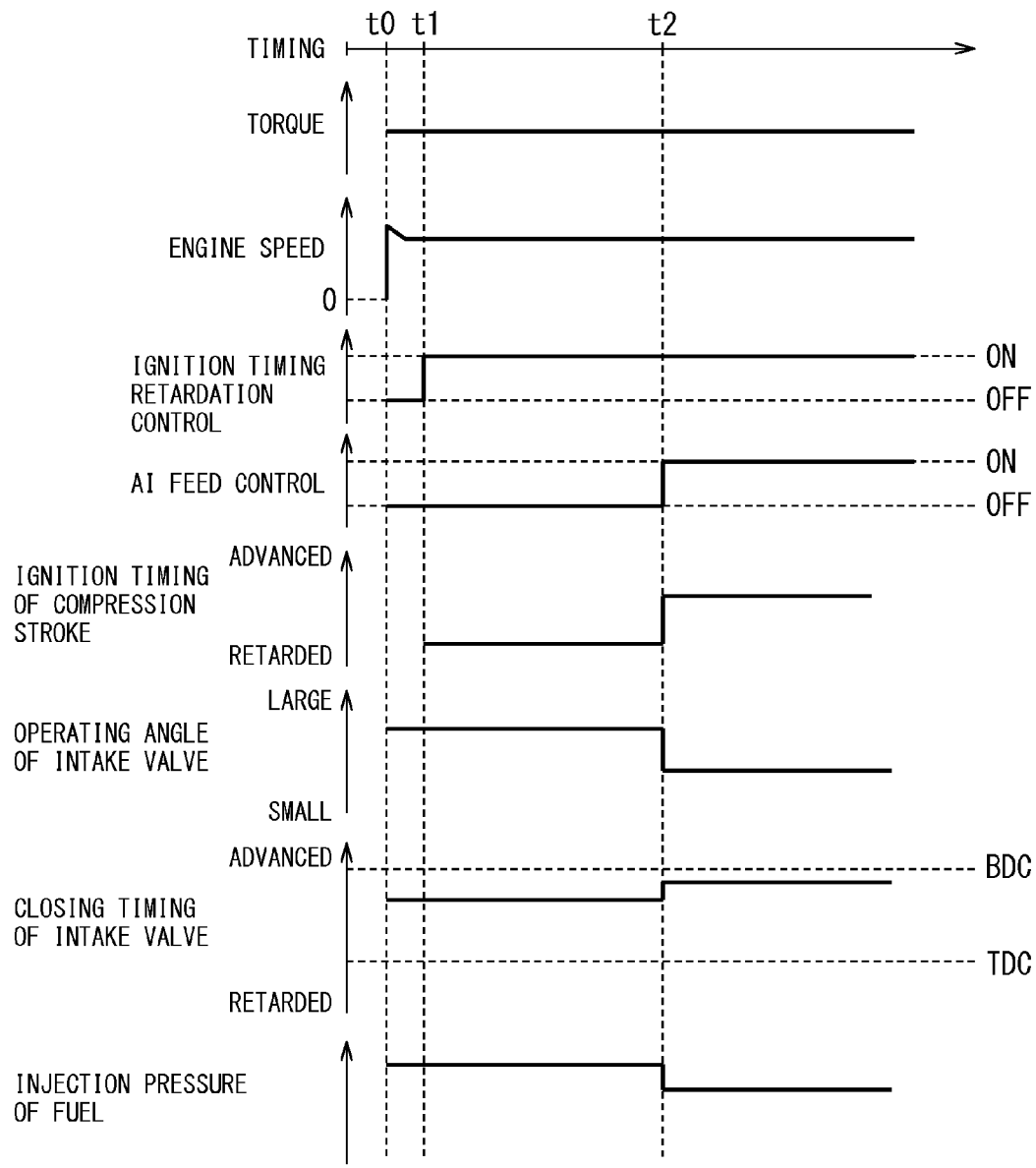
FIG. 15 is a time chart at the time of start-up of the internal combustion engine at Embodiment 2.

FIG. 15 is a time chart of control at the time of start-up of the internal combustion engine in the present embodiment. In the present embodiment, in addition to the control in Embodiment 1 which is shown in FIG. 5, further additional control is performed. At the time t0, the internal combustion engine is started up while at the time t1, the first catalyst warm-up control is started in the same way as Embodiment 1. At the time t2, the first catalyst warm-up control is switched to control for simultaneously performing the first catalyst warm-up control and the second catalyst warm-up control in the same way as Embodiment 1.

In the control in the present embodiment, at the time t2, control for advancing the injection timing of fuel in the compression stroke is performed. In the present embodiment, the timing is advanced so that the fuel which is injected in the compression stroke reaches a position away from the cavity of the top surface of the piston. Further, at the time t2, control for making the operating angle of the intake valve 6 smaller is performed. By making the operating angle of the intake valve 6 smaller, the opening timing of the intake valve is retarded and the closing timing of the intake valve is advanced. In the example which is shown in FIG. 15, the closing timing of the intake valve is advanced to near bottom dead center. Further, the amount of movement of the intake valve is decreased. Furthermore, at the time t2, control is performed to reduce the injection pressure of the fuel. In the present embodiment, control is performed to decrease the discharge pressure of the high pressure pump.

By employing at least one control among the plurality of controls for stabilizing combustion in the present embodiment, it is possible to improve the combustion ability of fuel right after switching from the first catalyst warm-up control to control for simultaneously performing the first catalyst warm-up control and the second catalyst warm-up control or during the time period of control for simultaneously performing the first catalyst warm-up control and the second catalyst warm-up control.

In the present embodiment, an operating angle changing mechanism which can change the operating angle of the intake valve continuously is employed, but the invention is not limited to this. It is possible to employ any mechanism which can change the operating angle of an intake valve. Further, it is possible to employ any mechanism which can change the closing timing of the intake valve. For example, the operating angle changing mechanism includes a plurality of types of intake cams. By switching the intake cams, it is also possible to change the operating angle of the intake valve. Further, it is also possible to change the phase of the intake cam shaft so as to make the closing timing of the intake valve changeable.

The rest of the constitutions, actions, and effects are similar to those of Embodiment 1, so explanations will not be repeated here.

The above embodiments can be suitably combined. In the above control procedures, it is possible to suitably change the orders of the steps in a range where the functions and actions are not changed. In the above-mentioned figures, the same or corresponding parts are assigned the same reference notations. Note that, the embodiments are illustrative and do not limit the invention. Further, in the embodiments, changes in the embodiments shown in the claims are included.

REFERENCE SIGNS LIST 1. engine body
3. piston
3a. cavity
5. combustion chamber
6. intake valve
7. intake port
10. spark plug
11. fuel injector
19. exhaust manifold
20. exhaust purification catalyst
25. secondary air feed device
27. air pump
28. air switching valve
31. electronic control unit
51. operating angle changing mechanism
52. rocker arm
53. intake cam
61. input part
61c. roller
62, 63. rocking cam 62a, 63a. nose
64. support pipe
65. control shaft
66. electric actuator
75a, 76a. high concentration region
75b, 76b. low concentration region
81. fuel tank
83. high pressure pump

The invention claimed is:

1. An internal combustion engine comprising:
an in-cylinder fuel injector which injects fuel to an inside of a combustion chamber;
an exhaust purification catalyst which is arranged in an engine exhaust passage;
a secondary air feed device which feeds air at an upstream side of the exhaust purification catalyst in the engine exhaust passage;
a control device which controls the in-cylinder fuel injector and the secondary air feed device; and
an ignition device which ignites an air-fuel mixture of the fuel and air in the combustion chamber; wherein
the control device including an electronic control unit having a microprocessor, memory, and at least one input and output port, the control device configured to:
perform a first catalyst warm-up control and a second catalyst warm-up control which promote a temperature rise of the exhaust purification catalyst,
the first catalyst warm-up control includes control which injects fuel from the in-cylinder fuel injector in a compression stroke to form a high concentration region where a concentration of fuel at part of the combustion chamber rises and a low concentration region where the concentration of the fuel is lower than the high concentration region, and control which retards an ignition timing to make a temperature of an exhaust gas which flows out from the combustion chamber rise,
the second catalyst warm-up control includes control which feeds air into the engine exhaust passage to make components which are contained in the exhaust gas oxidize to make the temperature of the exhaust gas rise,
the control device performs the first catalyst warm-up control after start-up of the internal combustion engine in the state not performing the second catalyst warm-up control and performs control for simultaneously performing the first catalyst warm-up control and the second catalyst warm-up control after performing the first catalyst warm-up control,
the control device performs the first catalyst warm-up control in the state not performing the second catalyst warm-up control is a control which forms a first stratified state where the air-fuel ratio of the combustion chamber as a whole becomes lean and where the air-fuel ratio of the high concentration region becomes rich, and
the control for simultaneously performing the first catalyst warm-up control and the second catalyst warm-up control is a control which forms a second stratified state where the air-fuel ratio of the combustion chamber as a whole becomes rich at the time of ignition and where a stratification degree is weaker than the first stratified state.

2. The internal combustion engine according to claim 1, further comprising an operating angle changing mechanism which changes an operating angle of an intake valve, wherein the control device switches from the control which performs the first catalyst warm-up control in the state not performing the second catalyst warm-up control to the control for simultaneously performing the first catalyst warm-up control and the second catalyst warm-up control and to make the operating angle of the intake valve decrease.

3. The internal combustion engine according to claim 1, wherein the control device switches from the control which performs the first catalyst warm-up control in the state not performing the second catalyst warm-up control to the control for simultaneously performing the first catalyst warm-up control and the second catalyst warm-up control in the time period during which a load after start-up of the internal combustion engine is constant.

4. The internal combustion engine according to claim 1, wherein the control device performs control which switches from the control which performs the first catalyst warm-up control in the state not performing the second catalyst warm-up control to the control for simultaneously performing the first catalyst warm-up control and the second catalyst warm-up control and which makes an amount of fuel which is injected from the in-cylinder fuel injector in the compression stroke decrease.

5. The internal combustion engine according to claim 4, further comprising an injection pressure changing device which changes an injection pressure of the in-cylinder fuel injector, wherein the control device performs control which makes the injection pressure of the in-cylinder fuel injector decrease so as to make an amount of fuel which is injected from the in-cylinder fuel injector in the compression stroke decrease.

6. The internal combustion engine according to claim 1, wherein the control device makes an injection timing of the in-cylinder fuel injector in the compression stroke advance when switching from the control which performs the first catalyst warm-up control in the state not performing the second catalyst warm-up control to the control for simultaneously performing the first catalyst warm-up control and the second catalyst warm-up control.

* * * * *